(12) United States Patent
Shah et al.

(10) Patent No.: US 7,778,962 B2
(45) Date of Patent: Aug. 17, 2010

(54) CLIENT STORE SYNCHRONIZATION THROUGH INTERMEDIARY STORE CHANGE PACKETS

(75) Inventors: Darshatkumar A. Shah, Bellevue, WA (US); Nils H. Pohlmann, Seattle, WA (US); Michael W. Thomas, Kirkland, WA (US); Andrei Maksimenka, Sammamish, WA (US); Lev Novik, Bellevue, WA (US); Sameer S. Mahajan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 11/110,159

(22) Filed: Apr. 20, 2005

(65) Prior Publication Data

US 2005/0246389 A1    Nov. 3, 2005

Related U.S. Application Data

(63) Continuation-in-part of application No. 10/889,423, filed on Jul. 12, 2004, now Pat. No. 7,401,104.

(60) Provisional application No. 60/567,141, filed on Apr. 30, 2004.

(51) Int. Cl.
*G06F 12/00* (2006.01)

(52) U.S. Cl. ............... 707/610; 707/625; 707/638

(58) Field of Classification Search ............ 707/2, 707/201–204, 610, 620
See application file for complete search history.

(56) References Cited

U.S. PATENT DOCUMENTS 5,081,070 A    1/1992    Yokoyama

| 5,710,922 | A | 1/1998 | Alley |
| 5,740,533 | A | 4/1998 | Lin |
| 5,745,481 | A | 4/1998 | Phillips |
| 5,774,717 | A | 6/1998 | Porcaro |
| 5,806,074 | A | 9/1998 | Souder |
| 5,842,213 | A | 11/1998 | Odom |

(Continued)

FOREIGN PATENT DOCUMENTS

EP    0974895 A2    1/2000

(Continued)

OTHER PUBLICATIONS

Andrews, T. et al., "Combining Language and Database Advances in an Object—Oriented Development Environment". OOPSLA Proceedings, Oct. 4-8, 1987, 430-440.

(Continued)

*Primary Examiner*—Wilson Lee
*Assistant Examiner*—Michael Le
(74) *Attorney, Agent, or Firm*—Workman Nydegger

(57) ABSTRACT

The subject invention pertains to systems and methods of data item synchronization. More specifically, the invention concerns synchronization of data entities utilizing an intermediary or shared storage system and associated data store. Each client sync device can include or be associated with an interface that facilitates communication between client synchronization devices and the intermediary storage system. The interface can send change information to the shared store utilizing change data packets including a data change attribute, a prerequisite knowledge attribute and a learned knowledge attribute. The data change attribute can specify changes to be made to certain data, while the attribute can include a complete copy or reference to a complete copy or single instance of data.

12 Claims, 15 Drawing Sheets

U.S. PATENT DOCUMENTS

| | | | |
|---|---|---|---|
| 5,870,765 A * | 2/1999 | Bauer et al. ................ | 707/203 |
| 5,893,106 A | 4/1999 | Brobst et al. | |
| 5,900,870 A | 5/1999 | Malone et al. | |
| 5,937,402 A | 8/1999 | Pandit | |
| 5,961,590 A | 10/1999 | Mendez | |
| 6,006,234 A | 12/1999 | Govindarajan | |
| 6,047,291 A | 4/2000 | Anderson et al. | |
| 6,085,192 A | 7/2000 | Mendez | |
| 6,108,004 A | 8/2000 | Medl | |
| 6,112,024 A | 8/2000 | Almond et al. | |
| 6,131,096 A | 10/2000 | Ng | |
| 6,151,606 A | 11/2000 | Mendez | |
| 6,182,044 B1 | 1/2001 | Fong | |
| 6,199,195 B1 | 3/2001 | Goodwin et al. | |
| 6,240,414 B1 | 5/2001 | Beizer | |
| 6,265,773 B1 | 7/2001 | Kinsman | |
| 6,295,541 B1 * | 9/2001 | Bodnar et al. ............... | 707/203 |
| 6,317,754 B1 | 11/2001 | Peng | |
| 6,324,533 B1 | 11/2001 | Agrawal | |
| 6,338,056 B1 | 1/2002 | Dessloch et al. | |
| 6,343,287 B1 | 1/2002 | Kumar | |
| 6,352,432 B1 | 3/2002 | Tsai | |
| 6,370,541 B1 | 4/2002 | Chou et al. | |
| 6,393,434 B1 | 5/2002 | Huang | |
| 6,430,564 B1 | 8/2002 | Judge | |
| 6,438,545 B1 | 8/2002 | Beauregard | |
| 6,477,527 B2 | 11/2002 | Carey | |
| 6,477,564 B1 | 11/2002 | Freyssinet et al. | |
| 6,519,597 B1 | 2/2003 | Cheng et al. | |
| 6,534,723 B1 | 3/2003 | Asai | |
| 6,545,209 B1 | 4/2003 | Flannery | |
| 6,553,391 B1 | 4/2003 | Goldring | |
| 6,556,983 B1 | 4/2003 | Altschuler et al. | |
| 6,564,228 B1 | 5/2003 | O'Connor | |
| 6,578,046 B2 | 6/2003 | Chang et al. | |
| 6,643,652 B2 | 11/2003 | Helgeson | |
| 6,671,757 B1 | 12/2003 | Multer et al. | |
| 6,694,336 B1 | 2/2004 | Multer et al. | |
| 6,697,818 B2 | 2/2004 | Li et al. | |
| 6,701,314 B1 | 3/2004 | Conover | |
| 6,701,345 B1 | 3/2004 | Carley | |
| 6,704,743 B1 | 3/2004 | Martin | |
| 6,708,221 B1 | 3/2004 | Mendez | |
| 6,721,871 B2 | 4/2004 | Piispanen | |
| 6,738,789 B2 | 5/2004 | Multer et al. | |
| 6,757,696 B2 | 6/2004 | Multer et al. | |
| 6,763,350 B2 | 7/2004 | Agrawal et al. | |
| 6,772,178 B2 | 8/2004 | Mandal et al. | |
| 6,801,604 B2 | 10/2004 | Maes | |
| 6,851,089 B1 | 2/2005 | Erickson | |
| 6,857,053 B2 | 2/2005 | Bolik et al. | |
| 6,892,210 B1 | 5/2005 | Erickson | |
| 6,895,586 B1 | 5/2005 | Brasher | |
| 6,920,452 B2 | 7/2005 | Dieberger | |
| 6,934,710 B1 | 8/2005 | Mills | |
| 6,976,027 B2 | 12/2005 | Cutlip | |
| 6,983,293 B2 | 1/2006 | Wang | |
| 6,987,222 B2 | 1/2006 | Deeds | |
| 6,990,513 B2 | 1/2006 | Belfiore | |
| 6,999,956 B2 | 2/2006 | Mullins | |
| 7,013,313 B1 | 3/2006 | LaRue | |
| 7,039,679 B2 | 5/2006 | Mendez | |
| 7,089,293 B2 | 8/2006 | Grosner | |
| 7,089,298 B2 | 8/2006 | Nyman | |
| 7,099,896 B2 | 8/2006 | Fields | |
| 7,099,932 B1 | 8/2006 | Frenkel | |
| 7,143,420 B2 | 11/2006 | Radhakrishnan | |
| 7,146,385 B1 | 12/2006 | Bruce | |
| 7,158,962 B2 | 1/2007 | Nelson | |
| 7,177,843 B2 | 2/2007 | Nguyen | |
| 7,178,100 B2 | 2/2007 | Call | |
| 7,237,045 B2 | 6/2007 | Beckman | |
| 7,243,103 B2 | 7/2007 | Murphy | |
| 7,254,574 B2 | 8/2007 | Cunningham | |
| 7,272,598 B2 | 9/2007 | Cunningham | |
| 7,349,913 B2 | 3/2008 | Clark | |
| 7,483,923 B2 | 1/2009 | Novik | |
| 7,512,638 B2 | 3/2009 | Jhaveri | |
| 2001/0044805 A1 * | 11/2001 | Multer et al. ............... | 707/201 |
| 2002/0091702 A1 | 7/2002 | Mullins | |
| 2002/0112045 A1 | 8/2002 | Nirkhe | |
| 2002/0143521 A1 | 10/2002 | Call | |
| 2002/0152422 A1 | 10/2002 | Sharma et al. | |
| 2002/0156792 A1 | 10/2002 | Gombocz | |
| 2002/0184163 A1 | 12/2002 | Lotter | |
| 2002/0198891 A1 | 12/2002 | Li | |
| 2003/0110189 A1 | 6/2003 | Agrawal | |
| 2003/0144849 A1 | 7/2003 | Kaivaya | |
| 2003/0158839 A1 | 8/2003 | Faybishenko et al. | |
| 2004/0024795 A1 | 2/2004 | Hind | |
| 2004/0025110 A1 | 2/2004 | Hu | |
| 2004/0055441 A1 | 3/2004 | Katsuta | |
| 2004/0073560 A1 | 4/2004 | Edwards | |
| 2004/0177744 A1 | 9/2004 | Strasser | |
| 2004/0199521 A1 | 10/2004 | Anglin | |
| 2004/0267834 A1 | 12/2004 | Sasaki | |
| 2004/0268240 A1 | 12/2004 | Vincent | |
| 2005/0065977 A1 | 3/2005 | Benson | |
| 2005/0256907 A1 | 11/2005 | Novik | |

FOREIGN PATENT DOCUMENTS

| | | |
|---|---|---|
| WO | 02/075539 | 9/2002 |

OTHER PUBLICATIONS

Beard, et al., "Multilevel and Graphical Views of Metadata", Research and Technology Advances in Digital Libraries, 1998, 256-265.

Berg, C., How Do I Create Persistent Java Objects? Dr. Dobb's Journal, 1997, 22(4), 98-101.

Bhattacharya, S. et al., "Coordinating Backup/Recovery and Data Consistency Between Database and File Systems", International Conference on Management of Data and Symposium on Principles of Database Systems, Proceedings of the 2002 ACM SIGMOD International Conference on Management of Data, 2002, 500-511.

Biliria, A., "The Performance of Three Database Storage Structures for Managing Large Objects", ACM SIGMOD, 1992,276-285.

Booch, G. Benjamin/Cummings Publishing Co, "Object-Oriented Analysis and Design with Applications". 1994, 155, 156, 179-183.

Bracchi et al., "Binary Logical Associations in Data Modelling", Modelling in Data Base Management Systems G.M. Nijssen, (ed); North Holland Publishing Company: 1976. 125-147.

Bunernan, P. et al., Inheritance and Persistence in Database Programming Languages, ACM, 1986, 4-15.

Chien, A.A., "Concurrent Aggregates (CA)—Design and Experience with a Concurrent Object—Oriented Language Based on Aggregates", J. Parallel and Distribuned Computing, 1995, 25(2), 174-196.

"Computervision Launches Design Automation Development Platform for Windows". PR Newswire. Financial News. Jan. 10, 1995.

D'Andrea, A. et al., "Unisql's Next Generation Object-Relational Database Management System", ACM SIGMOD Record, Sep. 1996, 25(2), 70-76.

Darby, C., Object Serialization in Java 1.1. Making Objects Persistent, WEB Techniques, 1997, 2(9), 55, 58-59.

"Developer's Guide to Apple Data Detectors-For Version 1 .O.2", OApple Computer. Inc., 1997, 1-34.

Dietrich, Walter C., Jr., et al., "TGMS: An Object-Oriented System for Programming Geometry", Sofiare-Practice and Experience, Oct. 1989, 19(10), 979-1013.

Dobashi, Y. et al, "Skylight for Interior Lighting Design", Computer Graphics Forum, 1994, 13(3), C85-C96.

Fegaras, Leonidas. "Optimizing Object Queries Using an Effective Calculus", ACM Transactions on Database Systems, Dec. 2000, 25(4), 457-516.

Findler, R.B. et al., Contract Soundness for Object-Oriented Languages ACM Conference on Object-Oriented Programming Systems, Languages, and Applications, OOPSLA, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen. et al. "Geographic Data Modeling: Requirements and Research Issues in Geographic Data Modeling," Nov. 2001, Proceedings of the 9th ACM International Symposium on Advances in Geographic Information Systems, 2-8.

Fuh, Y-C. et al, "Implementation of SQL3 Structured Types with Inheritance and Value Substiturability", Digital Symposium Collection, 2000, Abstract only, 2 pages www.acm.org/sigmod/disc/p_implementationoyostw.htm.

Garret, J.H., Jr. et al, "An Object Oriented Environment for Representing Buildini Design and Construction Data", Advanced Construction Technology Center, Jun. 1989, Document No. 89-37-04, 1-34.

Godoy Simoes, M. et al, "A RISC-Microcontroller Based Photovoltaic System for Illumination Applications", APEC 2000. Fifteenth Annual IEEE Applied Power Electronics Conference and Exposition. Feb. 6-10, 2000, 2, 1151-1156.

Goscinski, A. "Distributed Operating Systems The Logical Design", Addison-Wesley, 1991, 306-313.

Harrison, C.J. et al., "Structure Editors: User-Defined Type Values and Type Inference", IEEE, 2000, 241-247.

Haverlock, K., "Object Serialization, Java, and C++", Dr. Dobb's Journal, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", Proceedings of the 1995 ACM SIGMOD International Conference on Management of Data, 1995, 127-138.

Hsiao, H.I. et al., "DLFM: A Transactional Resource Manager", SIGMOD, Proceedings of the 2000 ACM SIGMOD International Conference on Management of Data, 2000, 58-528.

Kaneko, K., et al, "Design of 3D CG Data Model of Move Animation Database System", Advanced Database Research and Development Series, vol. 3. Proceedi of the Second Far-East Workshop On Future Database Systems, 1992, 364-372.

Kaneko, K. et al., Towards Dynamics Animation on Object-Oriented Animation Database System Move, Advanced Database Research and Development Series, vol. 4, Database Systems for Advanced Applications 1993, 3-10.

Karz, R.H., "Toward a Unified Framework for Version Modeling in Engineering Databases", ACM Computing Surveys, 1990, 22(4), 375-408.

Kawabe, S. et al. "A Framework for 3D Modeling Constraint-Based Description and Non-Manifold Geometric Modeling", A Collection of Contributions based on Lectures Presented at the 2d Toyota Conference, Organization of Engineering Knowledge for Product Modelling in Computer Integrated Manufacturing, Japan Oct. 2-5, 1988, 325-357.

Kempfer, L., "CAD Jumps on Windows 3.1 Bandwagon", Computer Aided Engineering, 1993, 24-25.

Khan, L. et al, A Performance Evaluation of Storing XML Data in Relational Database Management Systems, WIDM, 2001, 31-38.

Khoshafian, S. et al, "Object Identify", OOPSLA'86, 1986, 21, 406-416.

Kiesling, R., "ODBC in UNIX Environments", Dr. Dobb's Journal, Dec. 2002. 27(12). 16-22.

King et al, "TriStarp—An Investigation into the Implementation and Exploitation of Binary Relational Storage Structures", Proc. 8.sup.th BNCOD(British National Conference On Data Bases), pp. 64-84 (York 1990).

Krouse, J.K., "Geometric Models for CAD/CAM", Machine Design, Jul. 24, 1990, 99-105.

LeBlanc, Andrew R., et al, "Design Data Storage and Extraction Using Objects", Concurrent Engineering: Research and Applications, 1993, 1, 31-38.

Leontiev, Y. et al, "On Type Systems for Object-Oriented Database Programming Languages", AC Computing Surveys. Dec. 2002, 34(4), 409-449.

Lim, J.B. et al, "Transaction Processing in Mobile, Heterogeneous Database Systems", IEEE Trans, on Knowledge and Data Engineering, 2002, 14(6), 1330-1346.

Mallet, S. et al.. "Myrtle: A Set-Oriented Meta-Interpreter Driven by a Relational Trace for Deductive Databases Debugging", Lecture Notes in Computer Science, 1999, 1559, 328-330.

Mariani, J. A., Oggetto: "An Object Oriented Database Layered on a Triple Store", The Computer Journal. 1992, 35(2), 108-118.

McMahon, L.E, "SED-A Non-Interactive Text Editor", Bell Laboratories, Aug. 15, 1978, 10 pages.

"Mechanical Design Software (Buyers Guide)", Computer-Aided Engineering, Dec. 1993, 12(12), 32-36.

Melton, J. et al, "SQL and Management of External Data", SIGMOD Record, Mar. 2001, 30(1), 70-77.

Mitchell, W.J., "The Logic of Architecture", Massachusetts Institute of Technology, 1990, 139-143.

Novathe, S.B., "Evolution of Data Modeling for Databases," Communications of the ACM, Sep. 1992, 35(9), 112-123.

Nelson, M. et al, "Generic Support for Caching and Disconnected Operation", 4th Workshop on Workstation Operating Systems, Oct. 1993, 61-65.

Oracle 9i SQL Reference. Release 2 (9.2), Mar. 2002, 13-89 to 13-90.

Orenstein, J, et al, "Query Processing in the Object Store Database System", ACM SIGMOD International Conference on Management of Data, Jun. 1992, 21 (2),403-412.

Ottogalli. F.G. et al., "Visualisation of Distributed Applications for Performance Debugging", Lecture Notes in Computer Science, Jan. 2001, 2074, 831-840.

Pachet, et al, "A Combinatorial Approach to Content-Based Music Selection", Multimedia Computing and Systems, Jun. 7, 1999, 457-462.

Papiani, M. et al. "A Distributed Scientific Data Archive Using the Web, XML, and SQL/MED", SIGMOD Record, Sep. 1999, 28(3), 56-62.

Powell, M., "Object, References, Identifiers, and Equality White Paper", (Jul. 2, 1993). OMG TC Document 93.7.5, 1-24.

Prosise, J., "2-D Drafting: Why Pay More?", PCMagazine: The Independent Guide to IBM-Standard Personal Computing, 1993, 12(4). 255-289.

Reiner, A. et al., "Benefits of X-based Three-Tier Client/Server Model with ESRI Applications", Virtual Solutions, 1995, 9 pages.

Read, Ill, B.C., "Developing the Next Generation Cockpit Display System", IEEE Aerospace and Electronics Systems Magazine, 1996, 11(10), 25-28.

Rouse, N.E., "CAD Pioneers are Still Trailblazing", Machine Design, Oct. 22, 1987, 59(25), 117-122.

Roussopoulos, N. et al., "Using Semantic Networks for Data Base Management",—Proceedings of the 1st Supplemental V.LDB Conference, 1975, 144-172.

Santos, J.L.T. et al., "Computer Aided Mechanical Engineering Design Environment for Concurrent Design Process", Proceedings of the 1993 ITEC Workshop on Concurrent Engineering, May 4-6, 1993. Simulation in Concurrent Engineering, 71-83.

Seshadri, P., "Enhanced Abstract Data Types in Object-Relational Databases", The VLDB Journal, The International Journal on Very Large Databases, 1998, 7, 130-140.

Simon, A.R., Strategic Database Technology: Management for the Year 2000, 1995, pp. 6-9, 14-17, 55-57. Morgan Kaufmann Publishers.

Sreenath, N., "A Hybrid Computation Environment for Multibody Simulation", Mathematics and Computers in Simulation, 1992, 121-140.

Singhai. A. et al., "DDB: An Object Design Data Manager for VLSI CAD", Association for Computer Machinery, 1993, 467-470.

Stevens, T., "Value in 3-D", Industry Week, Jan. 8, 1995, 45-46.

Stonebraker, M., "The Case for Partial Indexes", SIGMOD Record, 1989, 18(4), 4-9.

Strickland, T.M., "Intersection of Relational and Object", Proceedings of the AM/FM International Conference XVII, Mar. 14-17, 1994, 69-75.

Sutherland, J. et al., "The Hybrid Object-Relational Architecture (HORA), An Integration of Object-Oriented and Relational Technology", Applied Computing: States of the Art and Practice, 1993, 326-333.

Suzuki, H. et al., "Geometric Modeling for Modeling Products", Proceedings of the Third international Conference on Engineering Graphics and Descriptive Geometry, Jul. 11-16, 1988, Vienna Austria, 2, 237-243.

Sreekanth, U. et al., "A Specification Environment for Configuring a Discrete-Part Manufacturing System Simulation Infrastructure", International Conference on Systems, Man and Cybernetics, Oct. 17-20, 1993, 1,349-354.

Taylor, R.H. et al., "An Integrated Robot System Architecture", Proceedings of the IEEE, Jul. 1983, 71(7), 842-856.

Varlumis I. et al., "Bridging XML-Schema and Relational Databases. A System for Generating and Manipulating Relational Databases using Valid XML Documents", DocEng'01, Nov. 9-10, 2001.

Wilcox, I., "Object databases-Object Methods in Distributed Computing", Dr. Dobbs Journal, Nov. 1994, 19 (13), 26-34.

Watanabe, S., "Knowledge Integration for Architectural Design", Knowledge-Based Computer-Aided Architectural Design, 1994, 123-146.

Waugh, A., "Specifying Metadata Standards for Metadata Tool Configuratiou", Computer Networks and ISDN Systems, 1998, 30, 23-32.

Wold, E. et al., "Content-Based Classification, Search, and Retrieval of Audio", IEEE Multimedia, IEEE Computer Society, 1996, 3, 27-36.

Yoshikawa, M. et al., "XRel: A Path-Based Approach to Storage and Retrieval of XML Documents Using Relational Databases", ACM Transactional on Internet technology, Aug. 2001, 1(1), 110-141.

Ramsey, N. et al., "An Algebraic Approach to File Synchroniza-tion", Software Engineering Notes, Association for Computing Machinery, 2001,175-185, XP-002295139.

Barker, J., "Beginning Java Objects," Wrox Press Ltd., 2000, pp. 1 and 94.

Bernstein et al., "The Microsoft Repository," Proceedings of the 23 VLDB Conference, 1997, http://citeseer.ist.psu.edu/ bernstein97 microsoft.html.

Bernstein, P. et al., "Microsoft Repository Version 2 & The Open Information Model," Microsoft Paper pub. In Information Systems, 1999, 22(4).

Fialli et al., "Java TM Architecture for XML Binding (JAXB) Specification," Sep. 12, 2002, Version 0.7, 1-178.

Gordon, A.D. et al., "Typing a Multi-Language Intermediate Code," POPL '01, London, UK, Jan. 2001, 257.

Guy, R.G. et al., "Implementation of the Ficus Replicated File System", Proceedings of the Summer USENIX Conference, Jun. 1990,63-71, XP 002234187.

Huang, Yun-Wu. et al., "Lightweight Version Vectors for Pervasive Computing Devices", IEEE, 2000,43-48.

Lubinsky, B., "Approaches to B2B Integration," EAI Journal, Feb. 2002.

Mazzola Paluska, J. et al., "Footloose: A Case for Physical Eventual Consistency and Selective Conflict Resolution", Proceedings of the 5th IEEE Workshop on Mobile Computing Systems and Applications, 2003, 170-179.

Singer, J., "NM versus CLR: A Comparative Study," PPPJ 2003, Kilkenny City, Ireland, Jun. 16-18, 2003, 167.

Soundarajan et al., Fifth International Conference on SoftwARE REUSE icsr, 1998, 206-215.

"Using Value Objects," By The Xdoclet Team, Last Published May 5, 2005, http://xdoclet. sourceforge.net/xdoclet/valueobjects.html.

Wang et al., paper on (OS) application programming interfaces (APIs), IEEE Communication Magazine, Oct. 2001.

Gray, J. et al., "The Dangers of replication and a Solution", SIGMOD, 1996, 25(2), 173-182, XP-002146555.

Helal, S. et al., "A Three-tier Architecture for Ubiquitous Data Access", Computer Systems and Applications ACS/IEEE, Jun. 2001, 177-180, XPOI0551207.

Kistler, J.J. et al., "Disconnected Operation in the Coda File System", ACM Transactions on Computer Systems, Feb. 1992, 10(1), 3-25, XP000323223.

Kistler, J.J. et al., "Increasing File System Availability t1rrough Second-Class Replication", IEEE, 1990,65-69, XPOI0021244.

"SyncML Sync Protocol", 2000, Version 1.0, 60 pages, http://www.syncml.org/docs/syncml protocol v10 2000 1207.pdf.

Seshadri, P. et al., "SQLServer for Windows Ce-a Database Engine for Mobile and Embedded Platforms", Data Engineering, Proceedings of the 16 International Conference, IEEE Computer Society, Mar. 2000, 642-644, XP 010378761.

Berenson, H. "A Critique of ANSI SQL Isolation Levels", SIGMOD Record, 1995, 24(2), 10 pages.

Greenwald, R. et al., "Oracle Essentials: Oracle 8 & Oracle 8i", Multi User Concurrency, 1999, Ch. 7, 7 pages, XP-002312028.

Plattner, C. et al., "Garrymed: Scalable Replication for Transactional Web Applications", IFIP International federation for Information Processing, 2004,155-174, XP-002370197.

Shapiro, M. et al., "Managing Databases with Binary Large Objects", IEEE, 1999, 185-193, XP-000922048.

AMG / Content-Data Licensing, http://www.allmediaguide.com/data.html, 2 Pages, Nov. 5, 2003.

Chryssostomidis, Chryssosiomos, et al. "Geometric Modeling Issues in Computer Aided Design of Marine Structures", MTS Journal, Dec. 1988, pp. 15-33, vol. 22, No. 2.

Beitner, N. D., et al. "Multimedia Support and Authoring in Microcosm: An Extended Model," Dept. of Electronics and Computer Science, Univ. of Southampton, Southampton SO17 1BJ, UK; Dept. of Computer Science, Univ. of Manchester,Oxford Road, Manchester M13 9PL, UK, 1994, pp. 1-12.

Nijssen, G. M. et al., "Conceptual Schema and Relational Database Design, A Fact Oriented Approach", Department of Computer Science, University of Queensland, Prentice Hall, 1989, pp. 10-33, 42-43, 48-51, 156-170.

* cited by examiner

CLIENT STORE SYNCHRONIZATION THROUGH INTERMEDIARY STORE CHANGE PACKETS

CROSS-REFERENCE TO RELATED INVENTIONS

This is a continuation-in-part of U.S. application Ser. No. 10/889,423, entitled SYSTEMS AND METHODS FOR SYNCHRONIZING COMPUTER SYSTEMS THROUGH AN INTERMEDIARY FILE SYSTEM SHARE OR DEVICE, filed Jul. 12, 2004, which claims the benefit of U.S. Provisional Application Ser. No. 60/567,141 entitled SYSTEMS AND METHODS FOR SYNCHRONIZING COMPUTER SYSTEMS THROUGH AN INTERMEDIARY FILE SYSTEM SHARE OR DEVICE, filed Apr. 30, 2004. The entireties of these applications are incorporated herein by reference.

TECHNICAL FIELD

The subject invention relates generally to computers and more particularly toward synchronization between computer data stores through an intermediary store.

BACKGROUND

Individuals these days utilize a myriad of computer devices or systems on a regular basis. For example, individuals can have a desktop computer and/or associated file server with which they interact at work. They can also have a laptop computer for working away from the office as well as one or more desktop computers at home. Furthermore, they may have palm top computers such as a personal digital assistant (PDA), pocket PCs, mobile phones and/or other portable devices they utilize for organizational, communication, or entertainment purposes. It is desirous that some data be copied to multiple devices to enable convenient access thereto. For instance, often a user copies files from a desktop computer or file server to a portable computer or device for use while the user is away from their office. The user then likely modifies or adds some new files while away from the office and subsequently needs to copy these files to their desktop computer or file server when they return to the office. Similarly, users may wish to copy pictures or music from one device to another (e.g., computer to MP3 player, digital camera to computer . . . ). Still further yet, users may demand that personal preferences and contacts (e.g., address book) be maintained across all or a subset of their computers. Thus, certain files need to be synchronized across multiple computers or devices.

In its simplest form, synchronization is merely the task of making designated files from multiple devices systems the same or consistent across systems. Typically, this means that the most up to data file versions are used to copy to a store. This process is automated by two-way, peer-to-peer, synchronization software applications. In particular, upon activation, a synchronization application can detect file changes or additions on a first device and copy or replicate new and/or altered files to a second device communicatively coupled to the first device, for instance via a hardwired or wireless connection. This causes the files on the first device to be synchronized with files on the second device.

Synchronization can also be performed remotely by accessing a network having a first device such as desktop computer coupled thereto. A second device such as a second desktop computer or laptop computer can be synchronized with the first device utilizing synchronization software. However, the synchronization software requires that both the first and second devices be powered-up and communicatively coupled to each other by way of the network. In this way, they communicate directly with each other similar to direct hardwired connection.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns data synchronization amongst one or more client systems utilizing an intermediary storage system. More particularly, the invention pertains to synchronization of items including file-backed and non-filed-backed items as well as other data entities. Change packets can be generated for designated new, altered or deleted entries. These packets can be generated by an interface component included or associated with a client system and transmitted for storage to an intermediary or shared storage system such as a file share server. These stored change packets can then be utilized to synchronize a plurality of client devices.

According to an aspect of the invention, the change packet can include change data, prerequisite knowledge, learned knowledge and made-with knowledge, among other things. Change data can specify changes to be made to an item. According to an aspect of the subject invention, change data can include a complete replica of particular types of data or data entities, which can be saved or serialized to the shared store. Only a single replica or single data instance is stored on the share. Older versions will be replaced with the latest version. The change data for an item or other data entity can include just changes that need to be effectuated rather than a complete replica. Prerequisite knowledge is the knowledge or set of changes that synchronization client must know in order to apply the changes provided by the change packet. Learned knowledge specifies what the synchronization client will learn if it applies the changes. Made-with knowledge carries the knowledge which client knew when item was created.

According to an aspect of the subject invention, the synchronization interface can include a conflict detection component. The conflict detection component can detect a conflict by comparing client system knowledge and intermediary store knowledge for a particular data entity. If a conflict is detected, a conflict event or knowledge exception can be raised, and a client system user or client system application can resolve the conflict.

In accordance with another aspect of the invention, the synchronization interface can include a conflict resolution component that can resolve detected conflicts automatically in accordance with a conflict resolution policy. This can enable conflicts to be resolved much quicker as well as facilitating convergence on the same resolution across different client systems.

In accordance with an aspect of the invention, the interface can employ a data integrity component and associated methods to lock data during reads and writes to ensure data is not compromised.

Systems and methods are also provided, in accordance with an aspect of the invention, to enable interoperability between an intermediary change packet store and an item store. For instance, systems and methods are provided to facilitate updating the intermediary change packet store with data packets and single instance data replicas upon detection of a designated entity change. Furthermore, systems and methods are disclosed to facilitate synchronizing client system stores utilizing data provided by the change packet store.

According to another aspect of the invention, the interface component can include a means and mechanism for retrieving and copying single instance data of any size to the shared store.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
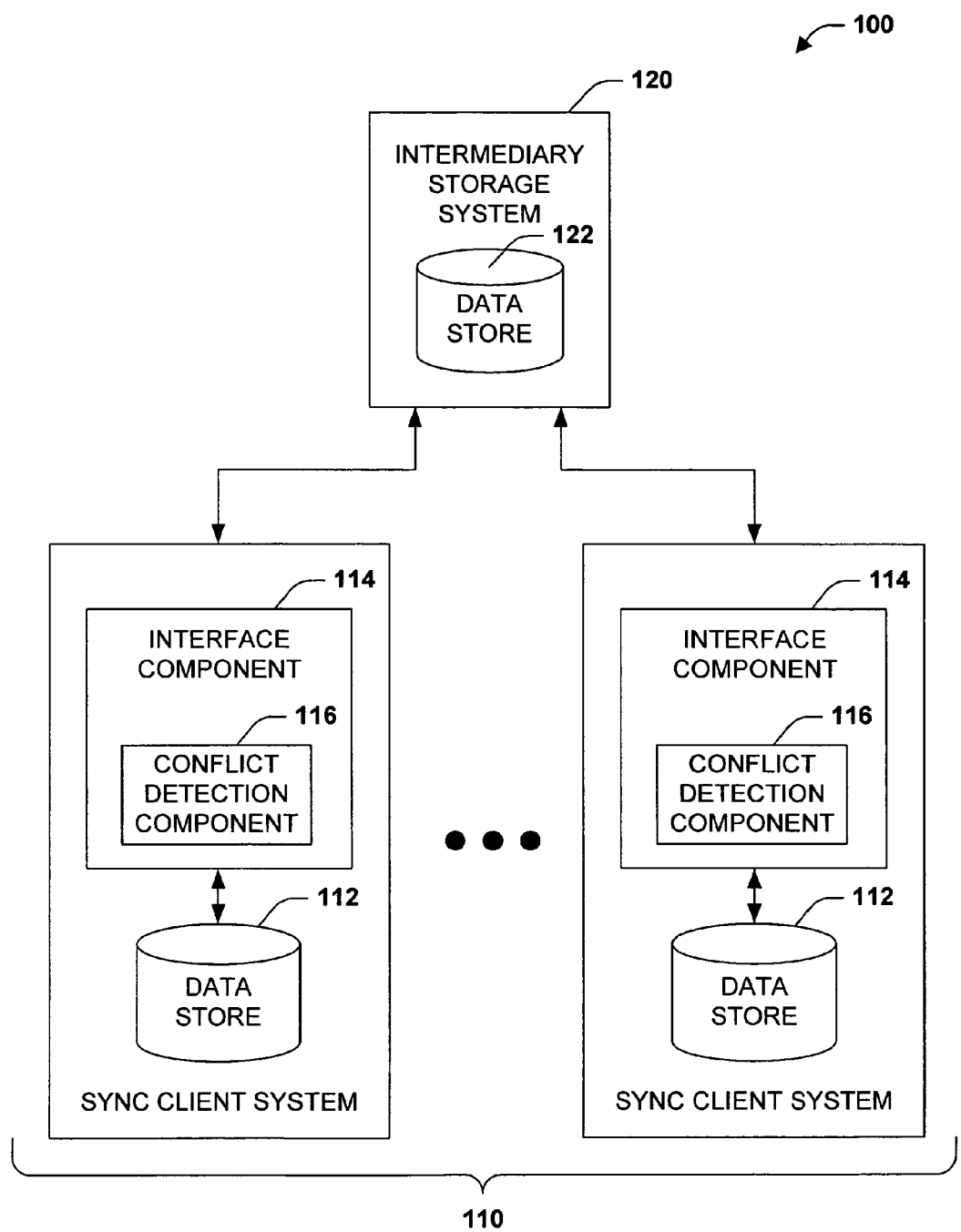
FIG. 1 is a block diagram of a data synchronization system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

"File" as used herein describes a conventional discrete unit of data including but not limited to a traditional file or file stream. Such a file can include but is not limited to a music file (e.g., MP3, MP4, WMA . . . ), a picture file (e.g., Jpeg, Gif, Mpeg . . . ), and a word processing document (e.g., doc, text, PDF, PostScript, RTF . . . ). Conventional file format can include rich metadata including not only their name and size but also properties and attributes embedded within the data unit. However, such rich metadata is conventionally only accessible by particular programs. For example, metadata identifying an artist and song title associated with a music file would require an audio player application to retrieve such metadata.

The term "item" as used herein is a discrete unit of data storable in a data store that can be manipulated by hardware, software, or a combination of hardware and software. Items are stand-alone objects that can be stored, retrieved, copied, deleted, moved, opened, printed, backed up, and restored, among other things. An item can be a regular non-file-backed item or a file-backed item. A non-file-backed item, or simply an item, is a schematized object that can comprise one or more elements and relationships. An element is an instance of a type comprising one or more fields (also referred to herein as a property). A relationship is a link between two or more items. A file-backed item acts as a bridge between legacy file format and the richly schematized item. A file-backed item can be any item that relies on a file to populate some or all of its properties. In particular, the file-backed item can include metadata associated with a file as well as the file stream itself.

The term "entity," "data entity," and the like as utilized herein is meant to include and refer to items (e.g., file-backed, non-file-backed), legacy files and any other discrete data unit or container.

The word "exemplary" is used herein to mean serving as an example, instance, or illustration. Any aspect or design described herein as "exemplary" is not necessarily to be construed as preferred or advantageous over other aspects or designs.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Turning initially to FIG. 1, a data synchronization system 100 is depicted in accordance with an aspect of the subject invention. Synchronization system 100 can include one or more sync client systems 110 and an intermediary storage system 120. Sync client systems 110 can be any computer (as described infra.) or computer device. For example, client system 110 include but are not limited to desktop and laptop computers, personal digital assists (PDAs), phones, cameras, and portable jukeboxes. Client systems 110 can include a data store 112 that supports organization, searching, sharing, synchronization, and security, among other things, of data that resides in the store. The data stores 112 may operate utilizing the same or different storage models, platforms or systems. According to one aspect of the invention, client data store 112 can support items as the fundamental or atomic unit of storage information. An item can be a group of simple and complex types defined in a schema for representing data. Furthermore, the data store can be implemented on a database engine. For instance, the database can comprise a relational database engine that implements the SQL query language. Still further yet, instead of a traditional tree to organize data, information can be organized as a direct acyclic graph of items (DAG). Such a storage system can offer search capacities never imagined with respect to conventional file systems. For instance, it is possible to find items according to the value of their properties and even to the value of the properties of items related to them. Alternatively, the client data store 112 can be a conventional file system. In a conventional data storage system, files are units of storable information, which may include the hardware/software interface system as well as application programs, data sets, and so forth. In such systems, groups of files are generally organized in folders. A folder is a collection of files that can be retrieved, moved, and otherwise manipulated as single units of information. These folders, in turn, are organized in a tree-based hierarchical arrangement called a directory.

The client system 110 can include an interface component 114. Among other things, interface component 114 can facilitate communication between a sync client system 110 and an intermediary storage system 120. Storage system 120 stores data that facilitates synchronization of two or more client devices 110. Accordingly, intermediary storage system 120 can include a data store 222. The intermediary storage system 120 can be any data storage facility that can be access by clients 110. According to one aspect of the invention the intermediary storage system 120 can be a simple file share server, among other things. For example, the intermediary could also be but is not limited to a email or exchange server. The storage system 120 need not operate on data. Rather, the storage system 120 can simply make the data stored therein accessible and available to client devices 110. Furthermore, intermediary storage system 120 need not be proximate to the clients 110. It can be accessed over a local area network (LAN) or a wide area network (WAN) such as the Internet. Client systems 110 can interface with intermediary storage system 120 through the interface component 114. These interface components 114 can be specifically designed or tailored to interact with the client device data store 112 and the associated data storage platform. Accordingly, client devices 110 of varying data storage platforms can be synchronized through the intermediary storage system 120.

In accordance with an aspect of the invention, interface component 114 can ensure that only the most recent version of data with all changes is stored on the intermediary storage system 120. An alternative system could store each data version on the intermediary storage system 120, however this approach is inefficient and unnecessarily ties up storage space. For example, if a gigabyte item was changed twenty times then the intermediary storage system 120 would have to store twenty-gigabyte data entities. The interface component 114 replaces previous versions of with the most recent version. However, synchronization conflicts can occur. For example, the intermediate data store can receive a data item which although later in time than a store copy does not account for or is not aware of previous data alterations. Interface component 114 can include a conflict detection component 116 to detect those and other synchronization conflicts. Upon detection of a conflict, conflict detection component can prevent the interface component 114 from applying the data entity or the changes thereto to the intermediary storage system 120.

Figure 2:
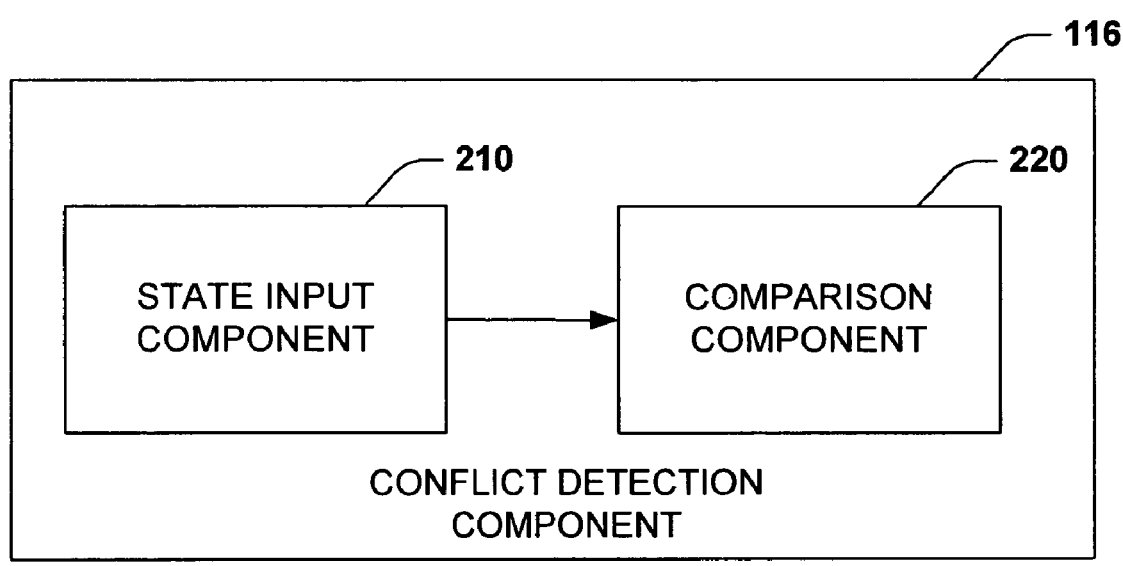
FIG. 2 is a block diagram of a conflict detection component in accordance with an aspect of the subject invention.

Turning to FIG. 2, a conflict detection component 116 is illustrated in further detail in accordance with an aspect of the subject invention. Conflict detection component 116 can include a state receiver or input component 210 and a comparison component 220. State receiver component 210 can receive/retrieve the synchronization state or knowledge of the current version of a data entity on the intermediary storage system 120 (FIG. 1). The state receiver component 210 can also receive/retrieve the synchronization state or knowledge associated with the new modified version of the data entry. State receiver component 210 is communicatively coupled to comparison component 210. Hence, the state receiver component can transmit received or retrieved state or knowledge to the comparison component 220. Comparison component 220 compares the received values. Data versions can be said to conflict if the new modified version does not include least the changes or knowledge of the current entity on the intermediary storage system 120. Accordingly, comparison component can compare the states of each data entity and determine whether the new modified version includes at least the state or knowledge of the version presently residing on the intermediary store. If so, the interface component 114 (FIG. 1) can update the intermediary store 220 (FIG. 1) by replacing the data entity with the new modified data entity. If, however, the new modified data entity does not include at least the knowledge of the currently stored version, then an exception can be generated and the new modified entity will not be applied or saved to the intermediary store 220. The detected conflict can then be resolved, if at all, by individual client system conflict policies, user input, or automated by use of artificial intelligence based systems.

Figure 3:
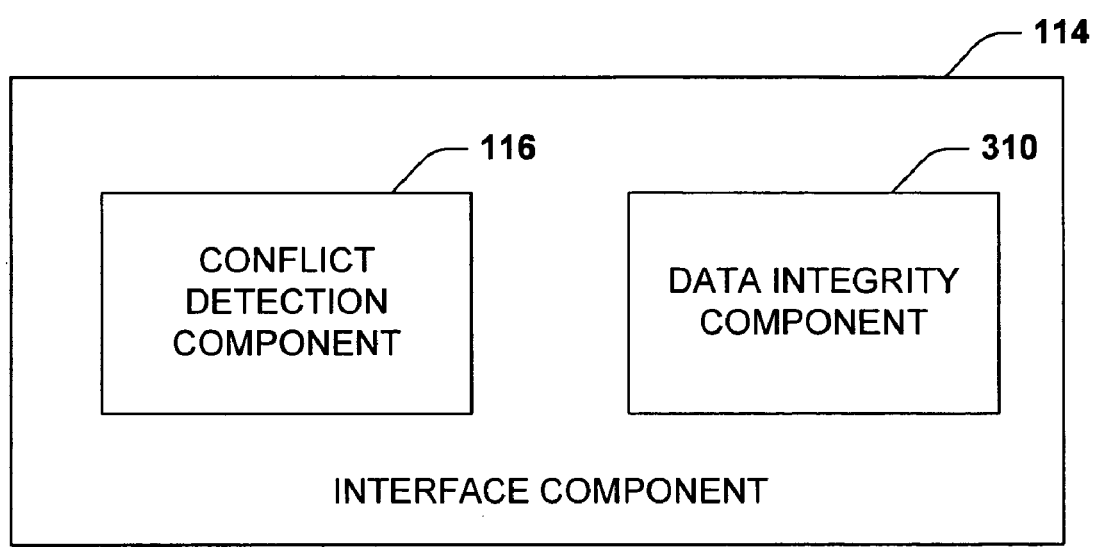
FIG. 3 is a block diagram of an exemplary interface component in accordance with an aspect of the subject invention.

FIG. 3 illustrates an interface component 114 in accordance with an aspect of the subject invention. In addition to including a conflict detection component 116, as described supra, the interface component 114 can include a data integrity component 310. Data integrity component 310 can preserve data integrity by locking data entities or groups thereof on the intermediary storage system 120 during interaction therewith. For example, during a send sync operation where the intermediary or shared storage system 120 is sent modified items and information related thereto, the data integrity component can impose a lock on access to the data item. The lock can prevent other processes from interacting with that data until the lock is released after the send sync operation commits. On a receive synch operation where the shared store is utilized to synchronize a client system 110 (FIG. 1), again the data integrity component 310 can be employed to lock the data entities or a group of data entities associated with the operation. To improve performance, data integrity component 310 can execute a write lock that prevents other processes or threads from writing to the lock portion of data. However, the lock will allow other processes to read the data. There is no threat to data integrity, as the data is not being modified, it is merely being read. Accordingly, the write lock can allow and facilitate synchronization of a plurality of client systems 110 concurrently. The data integrity component 310 can similarly apply and release particular locks for hybrid send and receive operations, where a client system is synchronized with the shared store and also provides modified data to the shared store.

It should further be appreciated that the data integrity component 310 can be employed with respect to a group of data items. Changes to an intermediary data store and synchronization do not often occur at a single data item level. Furthermore, data items can be grouped or related in a particular manner. Accordingly, conflict component 116 and data integrity component 310 can receive and operate on a collection of data items in a transactional batch process or multiple processes. For example, data integrity component 310 can apply locks and remove locks to a batch of items.

Figure 4:
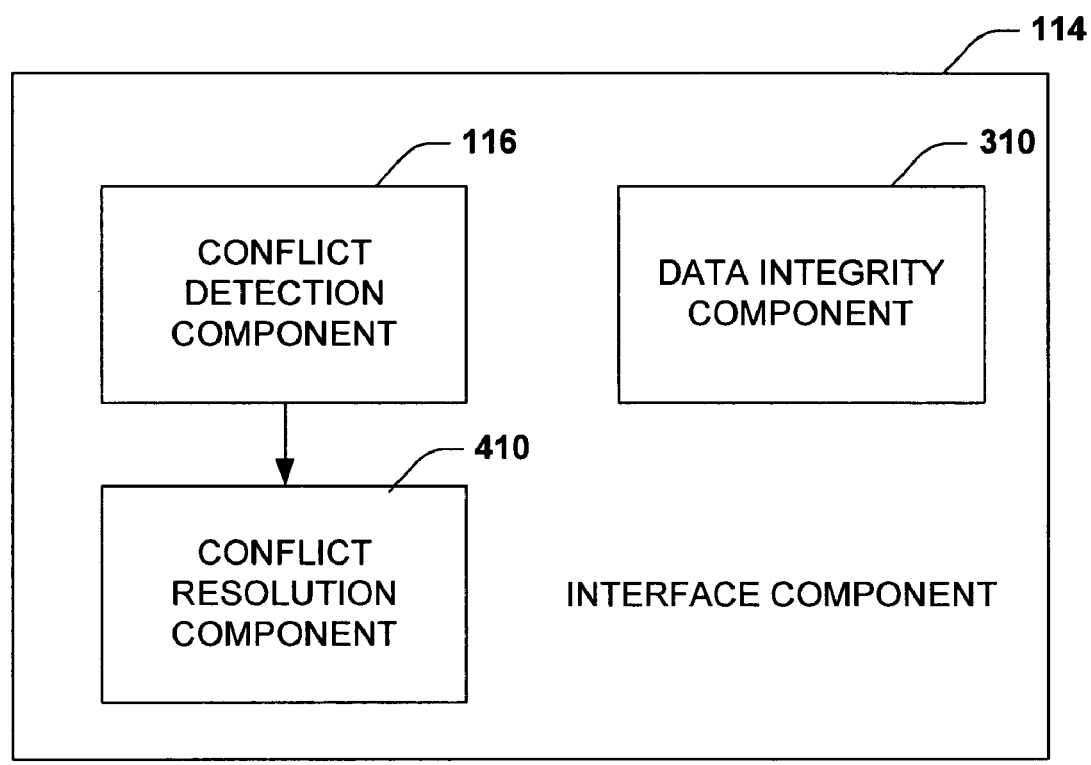
FIG. 4 is a block diagram of an exemplary interface component in accordance with an aspect of the subject invention.

Turning to FIG. 4 another exemplary interface component 114 is illustrated in accordance with an aspect of the subject invention. Similar to the interface component 114 of FIG. 3, this interface 114 can also include a conflict detection component 116 and a data integrity component 310. Furthermore, interface 114 can optionally include a conflict resolution component 410. According to one aspect of the subject invention, the interface component can simply include a conflict detection component 116. Conflict detection component can detect conflicts amongst data entity versions to be stored to an intermediary or shared storage system 120 (FIG. 1). For example, a conflict can be raised when a local client system is unaware or lacks knowledge of a remote version on an intermediary storage system, and the intermediary is unaware of or lacks knowledge of the client's local version. In addition to knowledge-based conflicts, there can be constraint-based conflicts. For instance, two replicas creating a file with the same name in the same directory could cause such a conflict to occur where constraints in the system (such as enforcement of unique item names within a folder) give rise to this type of conflict. Conflict detection component 116 can detect such conditions and generate an exception, which can be communicated to a client system 110. It is then up to the client system to resolve the conflict upon notification. Each client can then implement their own policies for handling conflicts including but not limited to remote wins (over write local), local wins (over write intermediary), last writer wins (based on time of operation) or write to log and let a user decide. However, this can lead to inconsistencies as individual clients may have quite different conflict resolution policies. Accordingly, conflict resolution component 410 can be part of the interface component 114. Conflict resolution component 410 can also support a plurality of conflict resolution policies or strategies including but not limited to those presented above. Furthermore, it should be appreciated that conflict resolution component 410 can infer resolutions, as that term is defined herein, utilizing artificial intelligence or knowledge based systems and/or methods. Unlike allowing each client to specify individual conflict policies, moving the conflict resolution functionality within the interface can provide a uniform policy. Furthermore, synchronization can be propagated more expeditiously and converge on the same resolution.

Communications between the client devices 110 (FIG. 1) and an intermediary store 122 or storage system 120 (FIG. 1) are enabled at least in part by the interface component 114. In accordance with an aspect of the subject invention, change packets or data packets (also referred to as a change unit) can be transmitted to the intermediary storage system to facilitate transmission of alterations to synchronized data items or replicas. The intermediary storage unit can receive, organize and store the change packets to facilitate synchronization amongst a plurality of client devices or systems.

Figure 5:
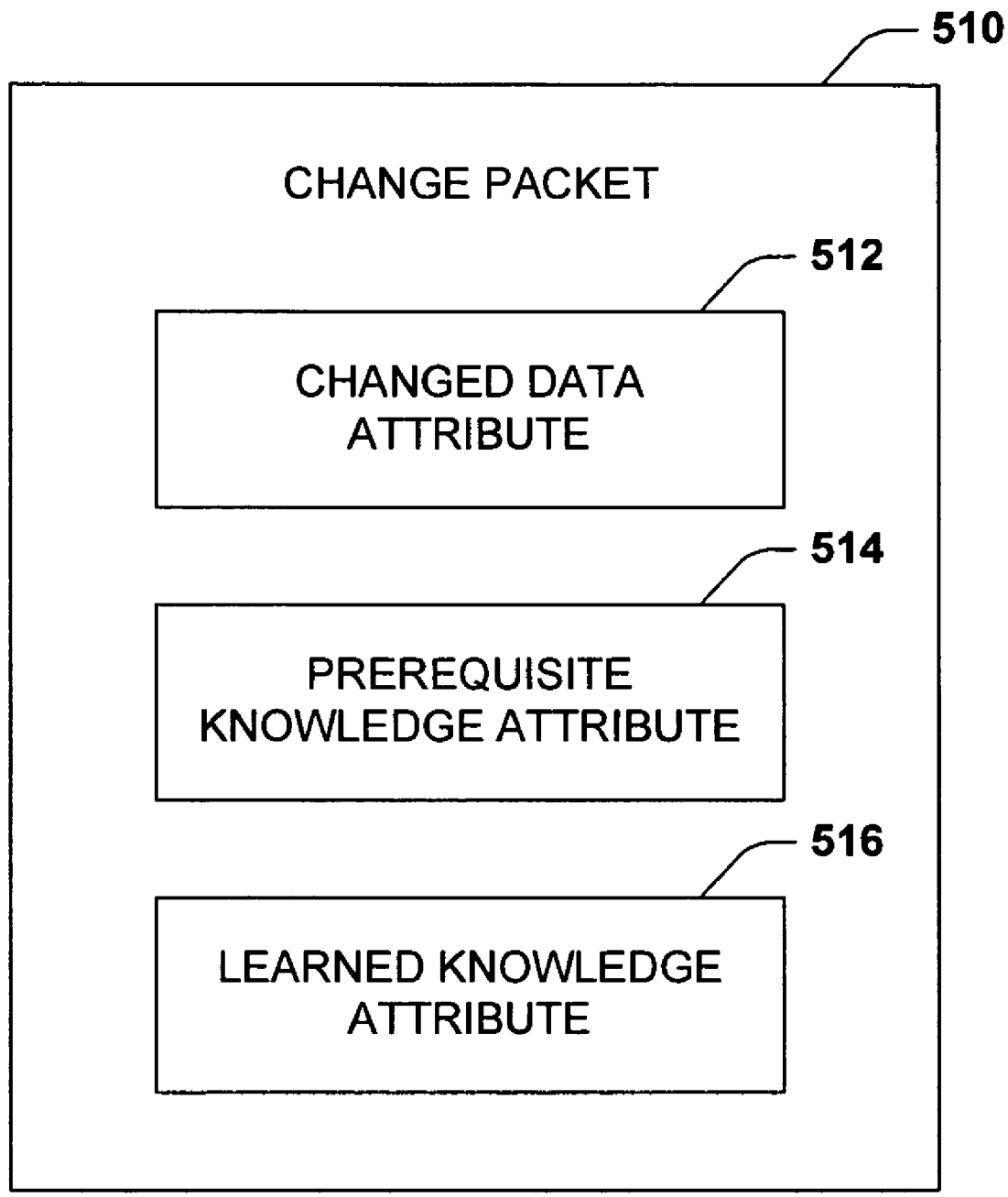
FIG. 5 is a block diagram of an exemplary change packet in accordance with an aspect of the subject invention.

Turning to FIG. 5, an exemplary change packet 510 is illustrated in accordance with an aspect of the subject invention. The change packet 510 is a schematized data packet for transmission of changes and information associated therewith. The change packet 510 can include a changed data attribute 512, a prerequisite knowledge attribute 514, and a learned knowledge attribute 516 all of which can be components as that term is defined herein. These three attributes constitute a packet triplet. The change data attribute 512 can include information pertaining to changes to be made to one or more data items. Furthermore, the change data attribute can include metadata concerning items including, for example, change history and item size. Synchronization can operate on the principle of net changes. Accordingly, the change data attribute can identify changes to be made to one or more entities. During a synchronization operation, the changes can be applied and the data reconstructed on a synchronizing client system or device. Thus, the intermediary store 122 (FIG. 1) does not include replicas of data items in this instance. However, in accordance with an aspect of the subject invention, the change data attribute 512 can include information for locating the changed data and/or a copy of the data itself. The intermediary storage system 120 (FIG. 1) can thus include a copy or replica of a data entity in this case. Furthermore, the change data attribute 512 can support both net changes as well as replication. For example, the change attribute 515 can specify changes to be made for non-file-backed items, while it can include or identify a replica or single data instance to be transferred to the intermediary storage system for file-backed items, however it should be appreciated that the invention is not so limited. In this manner, synchronization interoperability can be supported between data storage systems that employ items and those that utilize traditional files or file-backed items.

The remaining two illustrated attributes 514 and 516 pertain to synchronization knowledge. Knowledge represents the state of a given sync item replica at any time. Such knowledge can encapsulate metadata about all the changes a given replica is aware of, either local or from other replicas. Knowledge for synchronization replicas can be maintained and updated across synchronization operations (e.g., send, receive . . . ). Furthermore, it should be appreciated that the knowledge representation allows it to be interpreted with respect to the entire community and not just relative to the particular replica where the knowledge is stored. Prerequisite knowledge attribute 514 specifies what knowledge a synchronization peer (client system, intermediary storage system . . . ) must already know to in order to apply an associated change. In particular, knowledge is related to the set of changes of which the peer is aware. Such knowledge can be employed to determine if a change can be applied and in conjunction with conflict detection. Learned knowledge attribute 516 specifies what a synchronization peer will learn if it applies the associated change. It should be appreciated that other information can be provided by the change packet 510, which is not illustrated. For example, the change packet 510 can include a made-with knowledge attribute that carries the knowledge, which a client knew when item was created.

Figure 6:
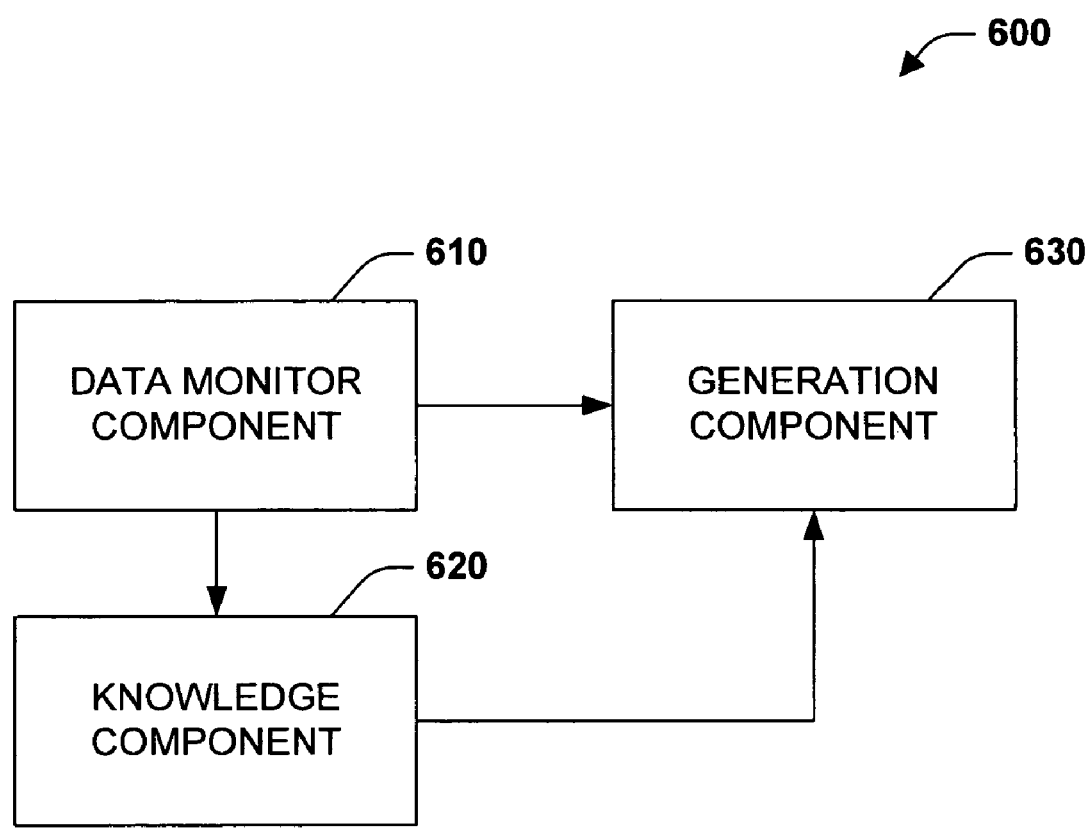
FIG. 6 is a block diagram of a change packet generation system in accordance with an aspect of the subject invention.

Turning to FIG. 6, a change packet generation system 600 is illustrated in accordance with an aspect of the subject invention. System 600 can be a part of a sync client system 110 (FIG. 1). Packet generation system 600 can include a data monitor component 610, knowledge component 620, and generation component 630. Monitor component 610 can observe synch data items to detect changes. For example, upon a save of a data entity it can analyze its state (e.g., file size, name . . . ) to determine whether an alteration has occurred. The monitor component 610 can identify an entity or changes thereto and provide such information to the generation component 630. Monitor component 610 can also provide entity metadata to the generation component 630. Furthermore, all or part of the information obtained by monitor component 610 can be transmitted to knowledge component 620. Knowledge component 620 can then produce prerequisite and learned knowledge from data. Generation component can receive/retrieve information concerning the identity and/or changes to a data entity as well as prerequisite and learned knowledge from the monitor component 610 and/or the knowledge component 620. Generation component 630 can then employ such data and a schema to produce a change packet ultimately for transfer to an intermediary storage system with a change packet store.

Figure 7:
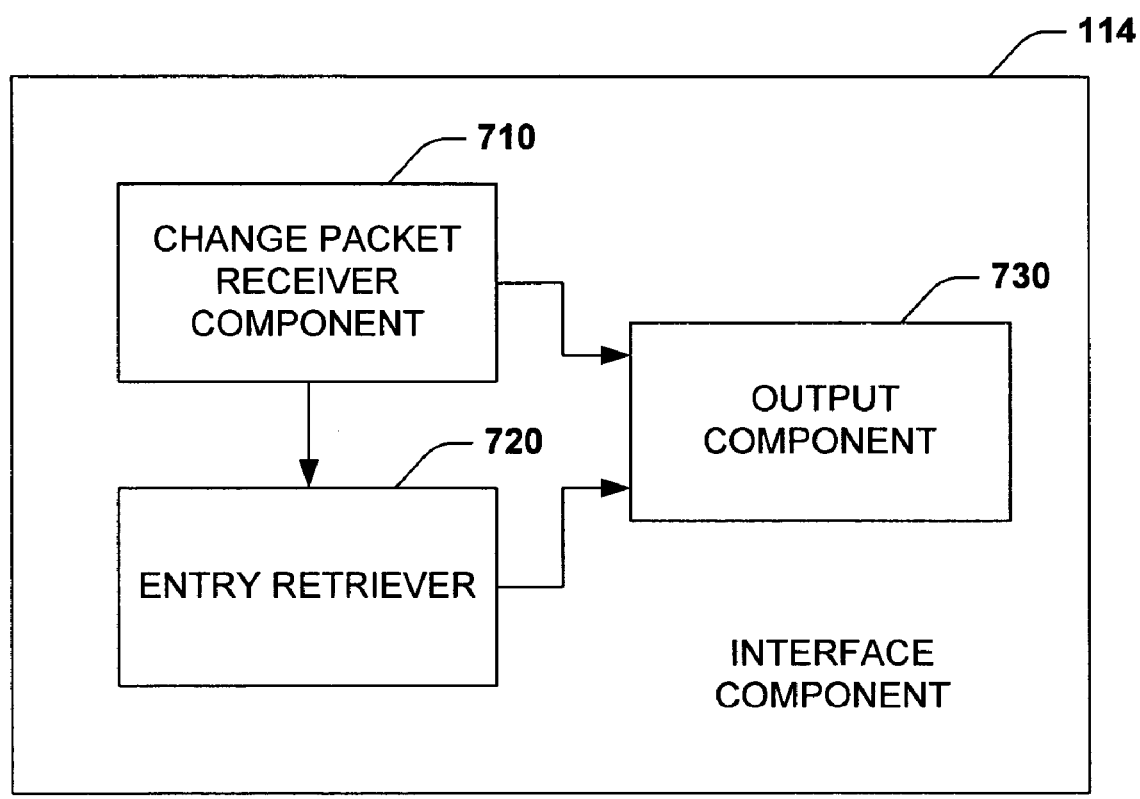
FIG. 7 is a block diagram of an exemplary interface component in accordance with an aspect of the subject invention.

FIG. 7 depicts an exemplary interface component 114 in accordance with an aspect of the subject invention. Interface component 114 can have a change packet receiver component 710 that receives a change packet. In addition to receiving the change packet, receiver component 710 can analyze the packet and determine whether changes to a data entry(s) are provided or whether a data entity is referenced for purposes of retrieval. In accordance with an aspect of the subject invention, if the change entity pertains to single instance data such data can be referenced in the packet for retrieval rather than providing the changes thereto or a copy thereof. However, the component 114 is not so limited. Packet receiver component 710 is communicatively coupled to entity retriever component 720. Packet retriever component 710 can provide identifying information concerning an entity, which entity retriever component 720 can ultimately recover from a synch client system. Both the change packet and any data retrieved are provided to output component 730. Output component 730 communicates with an intermediary storage system and provides the change packet and a data entity thereto. In accordance with an aspect of the invention, the single instance data can be serialized to a file on the intermediary storage system.

Figure 8:
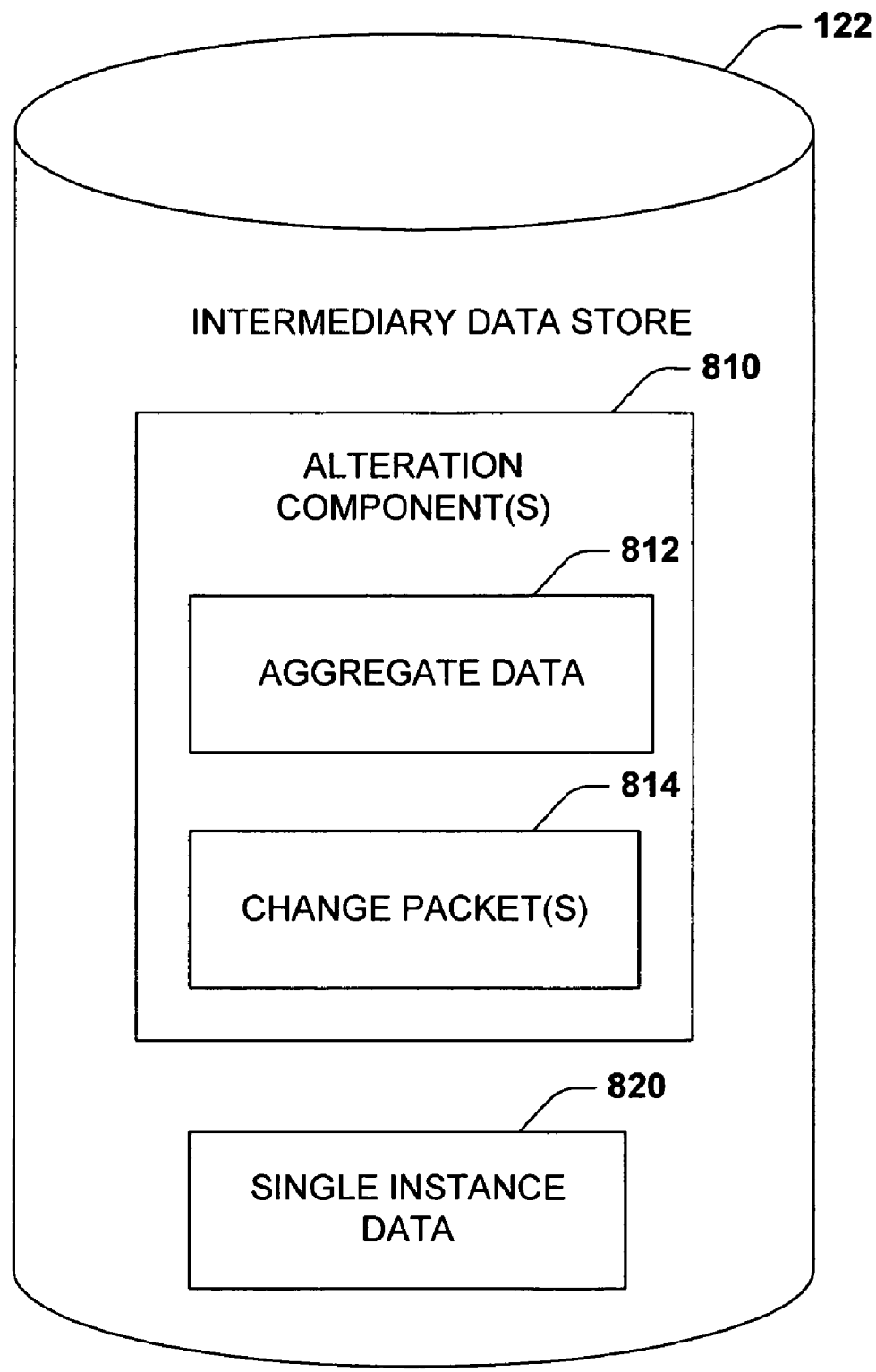
FIG. 8 is a block diagram of an exemplary intermediary data store in accordance with an aspect of the subject invention.

FIG. 8 illustrates an exemplary intermediary data store 122 in accordance with an aspect of the subject invention. The intermediary data store 122 can include alteration component(s) 810 and single instance data (s) 820, among other things. Alteration component 810 provides information concerning changes to data entities. Alteration component(s) 810 can include change packets 814 and aggregate data 812. Change packets 814 can identify changes to entities or entities that change as well as information related thereto. Aggregate data 812 can include global knowledge as well as information summarizing change packet information such as the number of packets, aggregate knowledge, and the like. Single instance data 820 includes copies or replicas of data entities. Such entities can be file-backed, non-file-backed items for example; however, in accordance with an aspect of the invention entities 820 can include replicas of file-backed items while changes to non-file-backed items can simply be identified in change packets 814. The identified changes can subsequently be effectuated by a synchronization client system 110 (FIG. 1). As mentioned previously, the intermediary data store 122 can correspond to an electronic mail or exchange server, among other things. In such a case, an email or contact can be single instanced. In accordance with a particular aspect of the invention, any data entity where it would be impossible, expensive or difficult to enumerate, send and/or apply changes can be single instanced.

Figure 9:
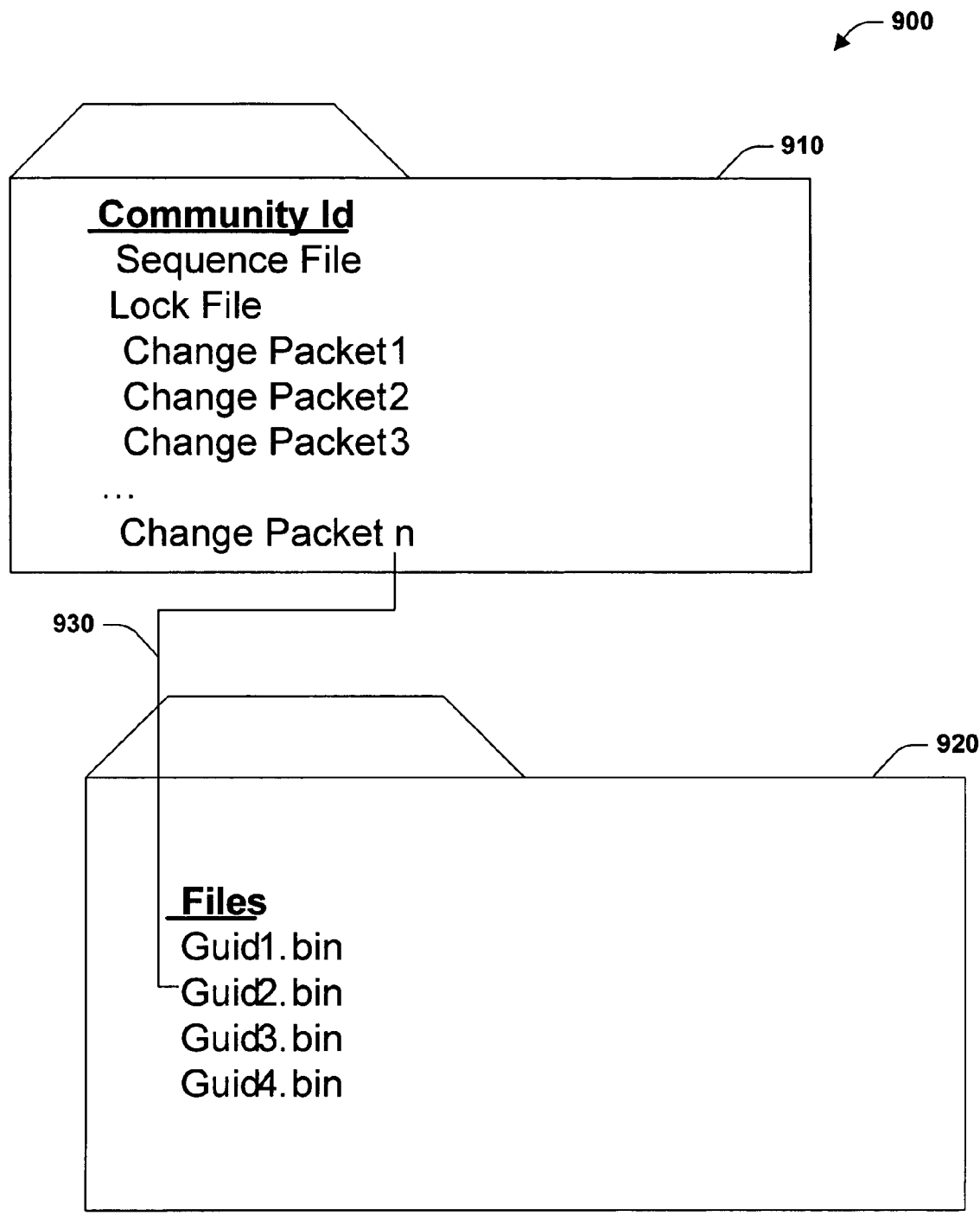
FIG. 9 is an exemplary intermediary data store schema in accordance with an aspect of the subject invention.

FIG. 9 depicts an exemplary intermediary data storage schema 900 in accordance with an aspect of the subject invention. In particular, two folders or containers 910 and 920 are provided each comprising a plurality of information. Folder 910 is a community synchronization folder. A community folder is an abstraction that represents a hypothetical "shared folder" with which all community members can synchronize. By way of example, if Joe wants to keep "My Documents" folders of his several computers in sync, Joe defines a community folder called, say, "JoesDocuments." Then, on every computer, Joe configures a mapping between the hypothetical "JoesDocuments" folder and the local "My Documents" folder. Subsequently, when Joe's computers synchronize with each other, they talk in terms of documents in "JoesDocuments," rather than their local items. This way, all Joe's computers understand each other without knowledge of others. In essence, the community folder 910 is the lingua franca of the sync community. Included in folder 910 are a sequence file, a lock file and a number of change packets. The sequence file can include global knowledge or data as well as information such as the number of packets in the folder. The lock file provides a mechanism for locking the directory during synchronization to ensure data integrity. Each change packet can include a triplet of files comprising change data, prerequisite knowledge, and learned knowledge, among other things. For example, for each changed item the following item information can be stored item type, item information (e.g., global ids, creation version, update version, delete date and time . . . ), change unit version information (e.g., name, version, id for each change unit), and property values (e.g., property names and values for each changed change unit). Folder 920 can include copies of single data instance data such as files or file streams, wherein only a single copy of each file is stored. As shown here, each file can be identified by a globally unique identifier (GUID). However, this computer identifier can be mapped to the actual name of the file (e.g., foo.txt) to facilitate additional usability of such files by a user or computer, for example. The connector 930 simply illustrates that there can be a relationship between a change packet in folder 910 and a replica file in folder 920.

In view of the exemplary systems described supra, methodologies that may be implemented in accordance with the present invention will be better appreciated with reference to the flow charts of FIGS. 10-13. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 10:
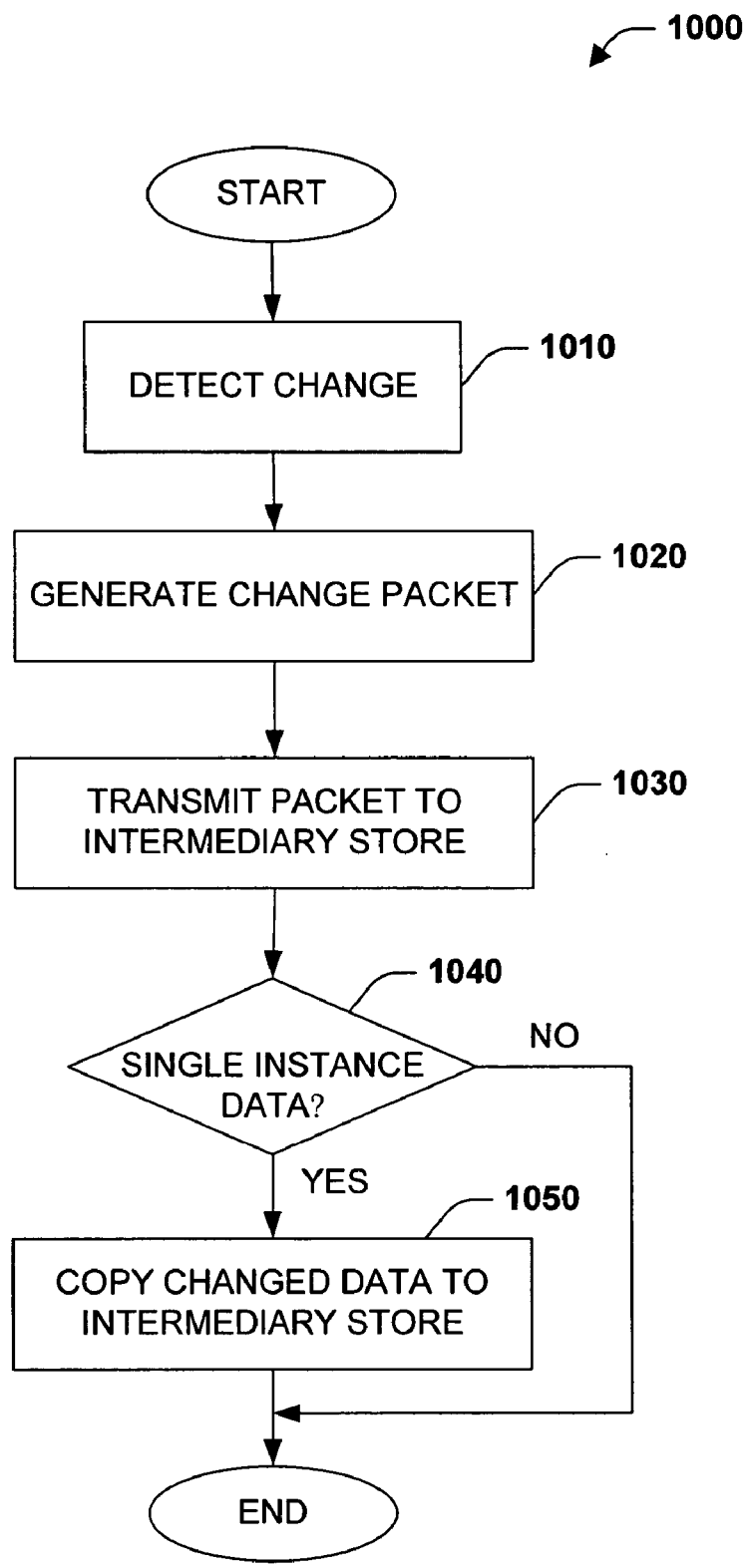
FIG. 10 is a flow chart diagram of a synchronization methodology in accordance with an aspect of the subject invention.

Turning to FIG. 10, a synchronization methodology 1000 is depicted in accordance with an aspect of the invention. At 1010, a change can be detected, for example in a designated synch replica folder, directory or other container. At 1020, a change packet is generated. The change packet can include change data, prerequisite knowledge, and learned knowledge, among other metadata. The change data can identify the entity or single data instance that changed. Furthermore, the change data can include a list of changes to be made to the item. These changes can later be applied to a replica to reconstruct and update an item. At 1030, the change packet can be transmitted to an intermediary data store to be accessed and shared by a plurality of synchronization devices. At 1040, a determination is made to ascertain whether the change concerns single instance data. If yes, then the method can proceed to 1050. If the entity does not concern single instance data the method can simply terminate. At 1050, a copy of the changed data is located and copied or transmitted to the intermediary storage system. This can be effectuated by serializing the data to a file on the store, for example. If a copy already resides on the shared or intermediary storage system, the current copy is replaced by the newest version of the entity if it is aware of all the changes of which the current version is aware.

Figure 11:
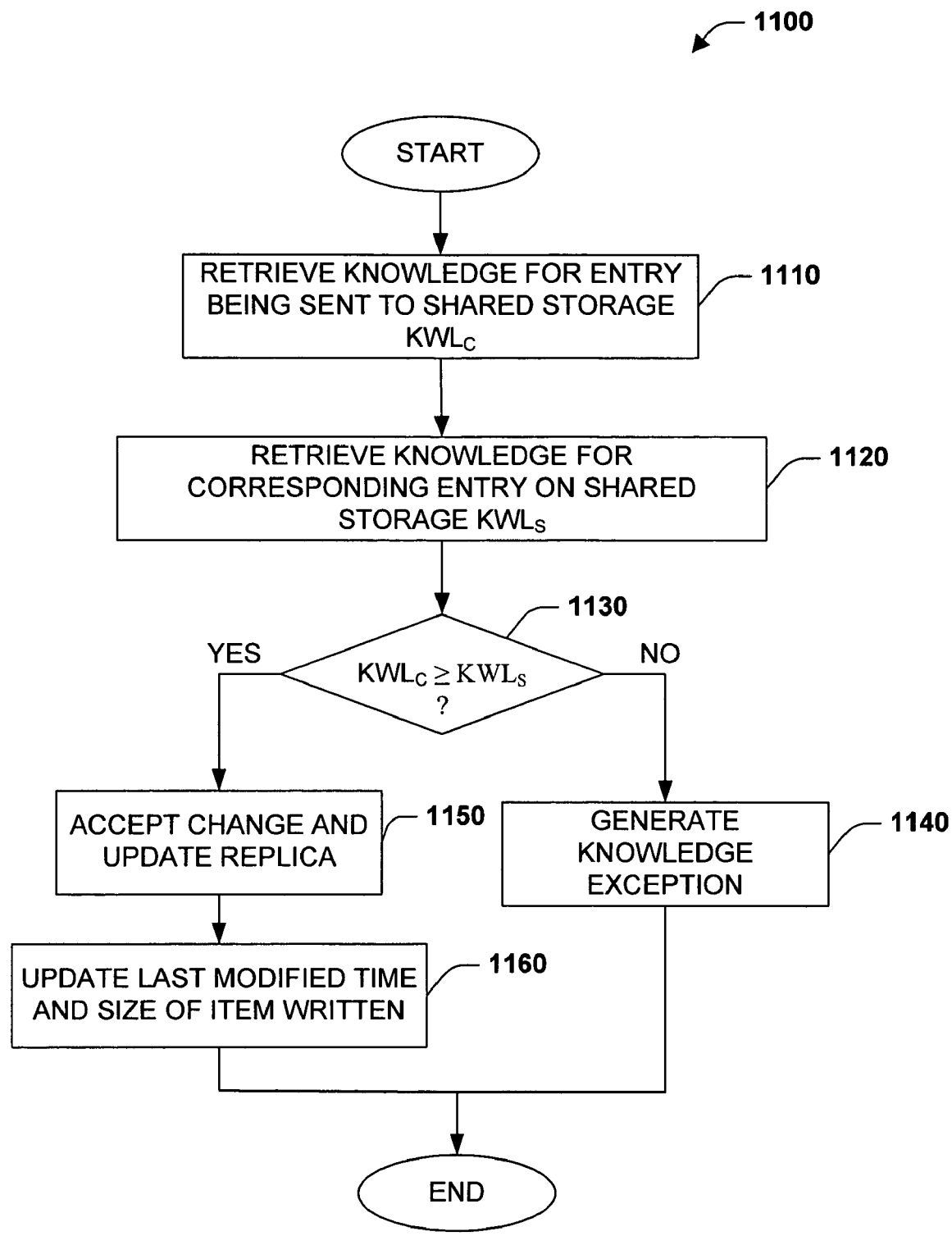
FIG. 11 is a flow chart diagram of a method of updating an intermediary storage system in accordance with an aspect of the subject invention.

FIG. 11 illustrates a method 1100 of updating an intermediary storage system in accordance with an aspect of the subject invention. At 1110, knowledge is retrieved for a change entity, $KWL_C$, being sent to the shared or intermediary store. At 1120, knowledge for a corresponding copy or replica on the shared store, $KWL_S$, is retrieved. Knowledge can correspond to an awareness of a set of changes. At 1130, a check is made to determine if the knowledge for a change entity being set to the store is greater than or equal to the knowledge of the corresponding replica currently on the shared store (if available). If it is not, then at 1140, a knowledge exception is generated and the change entity is not applied to the share. If $KWL_C$ is greater than or equal to $KWL_S$, then the change can be accepted and the replica updated with the new version, at 1150. The new version replaces the old such that there is only a single item instance stored. At 1160, the last modified time and the size of the replica are updated or written to the store. Furthermore, prerequisite and learned knowledge can be updated in view of the applied change. Still further yet, it should be appreciated that transactional locks can be utilized in method 1100 for updating the intermediary storage system. The store can be locked at the beginning of the method to prevent reading and writing of accessed data and then be released at the end of the method. By way of example consider the following pseudo code implementation of method 1100:

```
Lock Share
Share.GetRemoteKnowledge
While ReadChanges {
    Bool ApplyChange = true;
    If (isFileChange) {
        If (StreamChanged) {
            If (Change.Knowledge >= Share.Knowledge) {
                FilePath = GetFilePath( );
                If (StreamFile( ) ) {
                    ApplyAttributes( );
                }
                Else
                    ApplyChange = false;
            }
            Else
                ApplyChange = false;
            If (!ApplyChange) {
                AddKnowledgeExceptionToLearnedKnowledge( )
                Report item exception to sync client system
            }
        }
        Else { //No stream change, but may need to update attributes;
            FilePath = GetFilePath( );
            If ( FileExists(FilePath) && AttributeChanges) {
                ApplyAttributes( );
            }
        }
        If (ApplyChange)
            GetFullCompoundItem( )
    }
    If (ApplyChange) {
        Share.ApplyPrereq( );
        Share.ApplyChanges( );
        Acknowledge( );
        Share.ApplyLearned( );
    }
} // end while
Unlock share;
```

Exemplary Code Sample 1

Figure 12:
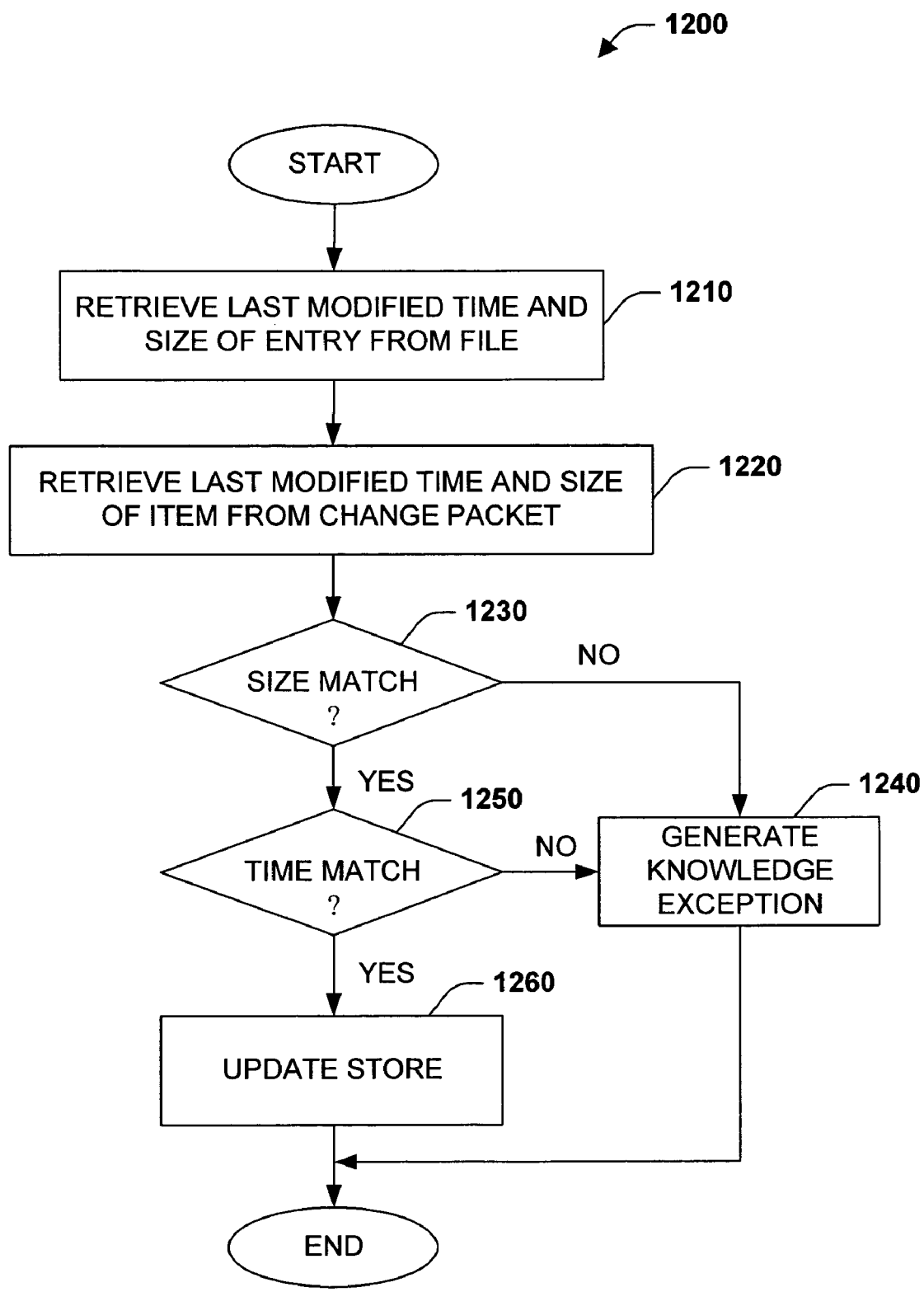
FIG. 12 is a flow chart diagram of a method of synchronizing a device utilizing a shared store in accordance with an aspect of the subject invention.

FIG. 12 depicts a method 1200 for synchronizing a computer device utilizing a shared store in accordance with an aspect of the subject invention. At 1210, the last modified time and size associated an entity replica to be updated is determined from that entity, for example utilizing a specific modification checker component. At 1220, the last modified time and size associated with the entity is retrieved from a change packet associated with the data entity. At 1230, a determination is made as to whether the sizes match. If they do not, then at 1240, a knowledge exception can be generated and the item is not written to synchronization device. If the last modified time does match, then at 1250, a determination is made as to whether the last modified times match. If the times do not match then the item is not written to the sync device and a knowledge exception can be generated at 1240. If, however, the times do match, then at 1260, the synch device store can be updated with a shared store replica and the method terminates. Thus, method 1200 ensures that the change and the entity versions match. Although not illustrated, the method 1200 can set the prerequisite knowledge to zero after updating the store at 1240 with single instance data, as the completely new version is copied to the sync device store.

Furthermore, it should be appreciated that locks could be applied in conjunction with method 1200 to ensure transactional integrity. In particular, the lock can be applied at the onset of this method to prevent writes to the data and subsequently release after the data is read or updated. The lock need only prevent writes, as multiple reads can be executed concurrently supporting simultaneous synchronization without jeopardizing data integrity. By way of example, consider the following exemplary psuedocode implementation of aspects of method 1200:

```
Lock Share for Read
While (ReadChanges( )) {
    Bool ApplyChange = true;
    If (IsFileChange( )) {
        If (VersionMatches(Change, File))
            SetPreReqKnowledgeToZero( )
        Else
            ApplyChange = false;
    }
    If (ApplyChange)
        ApplyChange( );
}
Unlock Share;
```

Exemplary Code Sample 2

It should also be appreciated that both the send and receive methodologies of methods 1100 and 1200 can be combined to produce a hybrid send and receive method.

Figure 13:
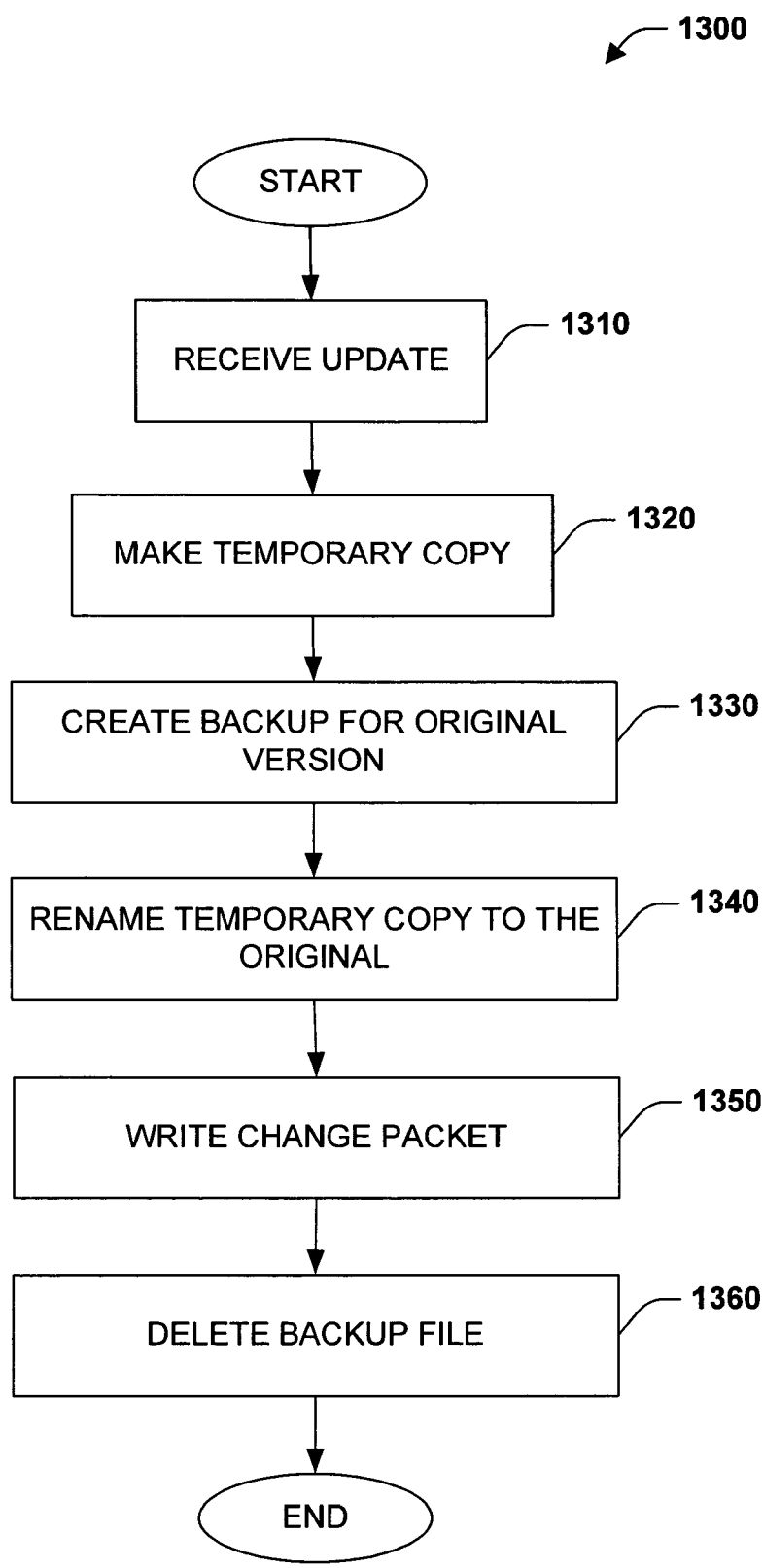
FIG. 13 is a flow chart diagram of a method for updating a shared store in accordance with an aspect of the subject invention.

FIG. 13 illustrates a method 1300 of updating a shared store in accordance with an aspect of the subject invention. Since only a single copy of single instance data is stored on the share, in accordance with an aspect of the invention, actions should be taken to ensure that a consistent state is maintained for devices to synchronize from in event of a failure during that process. Sync devices should not synchronize utilizing incorrect or incomplete data. At 1310, an updated version of the data is received, for example "foo.txt." The corresponding file on the share can be represented internally as a binary file with globally unique identifier such as "GUID1.bin." At 1320, a temporary copy is made of the received item and appropriately named, for example "GUID1.tmp." At 1330, a back-up copy is made for the original data such as "GUID1.bak." That is, a backup is made of the currently stored item on the share. If a system crash occurs up to this point, a device performing a receive sync can first check for "GUID1.bin" and if this does not exist then it can check for "GUID1.bak." Therefore, even if the system crashes up to this stage a receive sync device will correctly utilized the currently stored data or a backup thereof. At 1340, the temporary copy is renamed to the original or shared store copy. That is "GUID1.tmp" becomes "GUID1.bin" and replaces the old version. Thus, there will temporarily be two copies on the share of the same file, but this is needed to ensure reliability. However, a change packet will not read the updated file yet. Hence, if the system crashes at this point during a synchronization session, a device can first check the version of "GUID1.bin" and if it does not match, it can then check the back up version "GUID1.bak." If the backup version matches, this data is retrieved. At 1350, the change packet associated with this alteration is written to the shared store. At this point, a receive sync will correctly match this new updated version of the item "GUID1.bin." Finally, at 1360, the backup copy of the previous original "GUID1.bak" is deleted from the store. Additionally, although not illustrated, the method 1300 can update a sequence number associated with the current number of packets to include the newly written packet, among other things.

Figure 14:
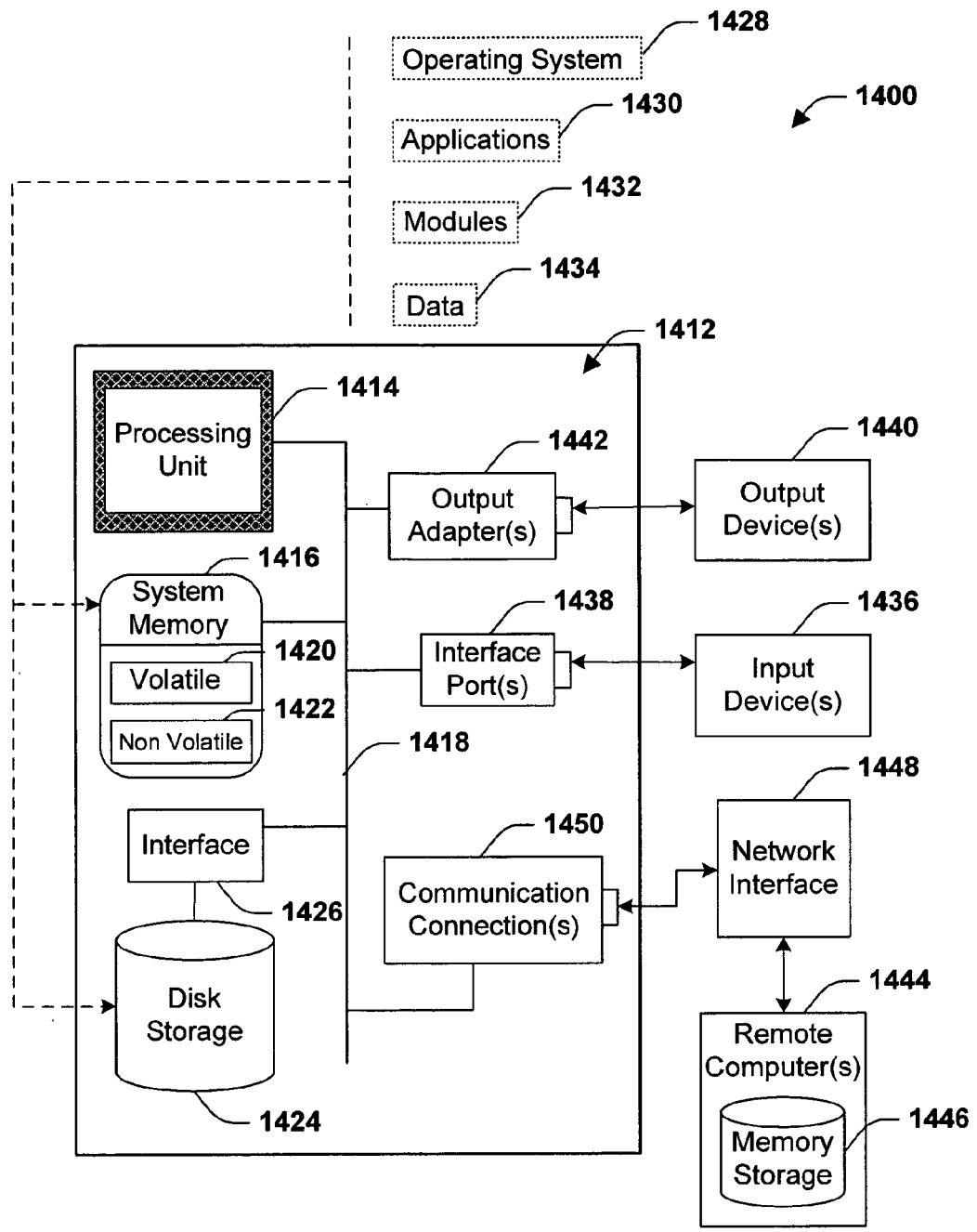
FIG. 14 is a schematic block diagram illustrating a suitable operating environment in accordance with an aspect of the present invention.
Figure 15:
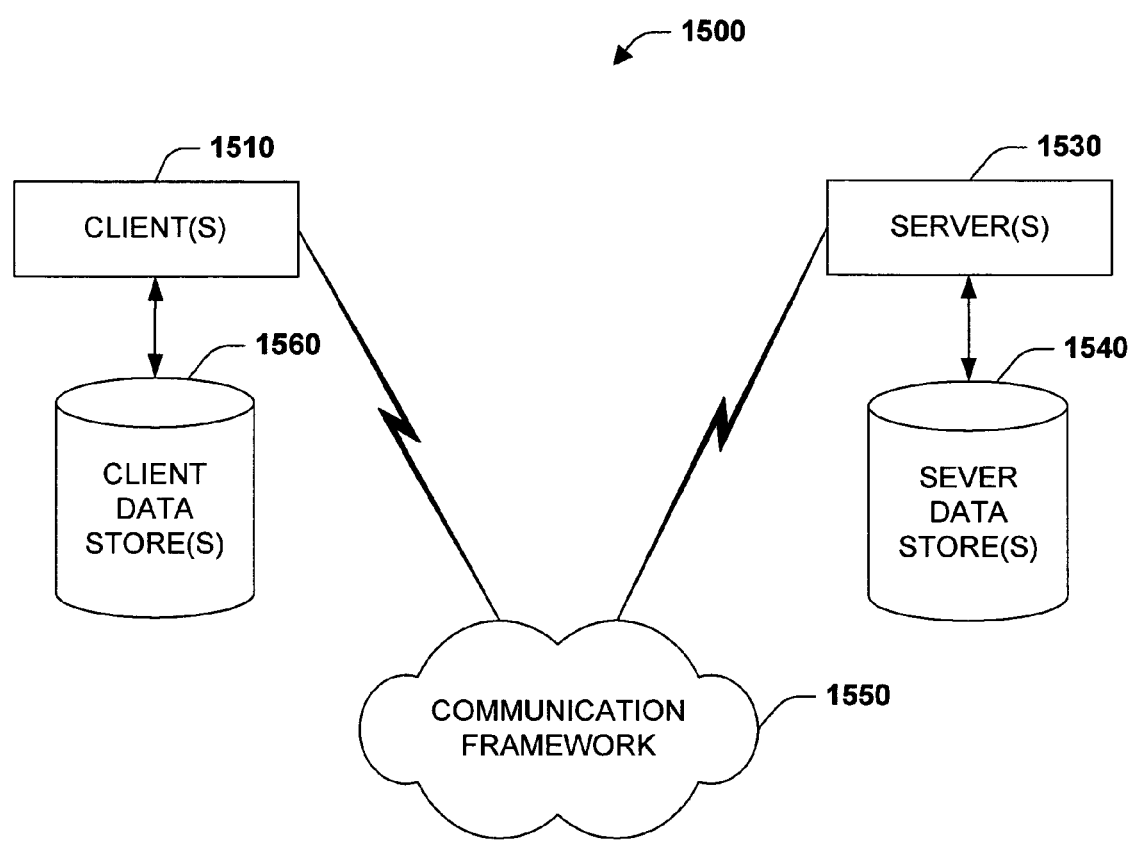
FIG. 15 is a schematic block diagram of a sample-computing environment with which the present invention can interact.

In order to provide a context for the various aspects of the invention, FIGS. 14 and 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 4124 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The server(s) 1530 can house threads to perform transformations by employing the present invention, for example. One possible communication between a client 1510 and a server 1530 may be in the form of a data packet transmitted between two or more computer processes. The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A method for synchronizing at least two computer systems, comprising the following steps:
   providing at least two client computer systems, wherein each client computer system utilizes a first storage platform;
   providing an intermediary computer system, wherein the intermediary computer system utilizes a second storage platform different from and lacking support for synchronization for the first storage platform;
   connecting the intermediary computer system to each client computer system;

providing a synchronization adapter to each client computer system enabling the client computer system to logically synchronize with the intermediary computer system;

synchronizing each client computer system with the intermediary computer system via the adapter resident on each client computer system; and synchronizing each client computer system with the other client computer systems by means of the intermediary computer system;

wherein changes to a first version of a file stored on a client computer system are synchronized to the intermediary computer system to allow a second version of the file stored on a different client computer system to be synchronized with the first version by the intermediary computer system performing the following steps:

receiving a change packet from the client computer system that identifies changes to the first version of the file that were made by the client computer system;

determining whether the first version of the file contains each change that has been synchronized to the intermediary computer system by comparing the identified changes in the change packet with change data associated with the file that is stored on the intermediary computer system such that:

upon determining that the first version of the file contains each change that has been synchronized to the intermediary computer system, the intermediary computer system replaces the change data with the identified changes in the change packet, whereas upon determining that the first version of the file does not contain each change that has been synchronized to the intermediary computer system, the intermediary computer system generates an exception and does not replace the change data with the identified changes in the change packet.

2. The method of claim 1, wherein replacing the change data with the identified changes in the change packet comprises writing the change packet to a packet store on the intermediary computer system, the change packet including the size and last modified date associated with the file.

3. The method of claim 2, wherein the change data and the change packet both include a last modified time and size for the file, and wherein comparing the identified changes in the change packet with change data associated with the file comprises:

retrieving a last modified time and size of the file from the change data;

retrieving the last modified time and size of the file from the change packet; and comparing the last modified time and size from the change data with the last modified time and size from the change packet.

4. The method of claim 3, further comprising first read locking the change data and unlocking the change data after retrieving the change data.

5. The method of claim 1, further comprising write locking the change data prior to determining whether the first version of the file contains each change that has been synchronized to the intermediary computer system and unlocking the change data after it is replaced or an exception is generated.

6. The method of claim 1, receiving a change packet comprises receiving a change packet identifying single instance data.

7. A computer storage medium storing computer executable instructions which when executed by a processor perform steps for synchronizing at least two computer systems, comprising the following steps:

providing at least two client computer systems, wherein each client computer system utilizes a first storage platform;

providing an intermediary computer system, wherein the intermediary computer system utilizes a second storage platform different from and lacking support for synchronization for the first storage platform;

connecting the intermediary computer system to each client computer system;

providing a synchronization adapter to each client computer system enabling the client computer system to logically synchronize with the intermediary computer system;

synchronizing each client computer system with the intermediary computer system via the adapter resident on each client computer system; and synchronizing each client computer system with the other client computer systems by means of the intermediary computer system;

wherein changes to a first version of a file stored on a client computer system are synchronized to the intermediary computer system to allow a second version of the file stored on a different client computer system to be synchronized with the first version by the intermediary computer system performing the following steps:

receiving a change packet from the client computer system that identifies changes to the first version of the file that were made by the client computer system;

determining whether the first version of the file contains each change that has been synchronized to the intermediary computer system by comparing the identified changes in the change packet with change data associated with the file that is stored on the intermediary computer system such that:

upon determining that the first version of the file contains each change that has been synchronized to the intermediary computer system, the intermediary computer system replaces the change data with the identified changes in the change packet, whereas upon determining that the first version of the file does not contain each change that has been synchronized to the intermediary computer system, the intermediary computer system generates an exception and does not replace the change data with the identified changes in the change packet.

8. The computer storage medium of claim 7, wherein replacing the change data with the identified changes in the change packet comprises writing the change packet to a packet store on the intermediary computer system, the change packet including the size and last modified date associated with the file.

9. The computer storage medium of claim 8, wherein the change data and the change packet both include a last modified time and size for the file, and wherein comparing the identified changes in the change packet with change data associated with the file comprises:

retrieving a last modified time and size of the file from the change data;

retrieving the last modified time and size of the file from the change packet; and comparing the last modified time and size from the change data with the last modified time and size from the change packet.

10. The computer storage medium of claim 9, further comprising first read locking the change data and unlocking the change data after retrieving the change data.

11. The computer storage medium of claim 7, further comprising write locking the change data prior to determining whether the first version of the file contains each change that has been synchronized to the intermediary computer system and unlocking the change data after it is replaced or an exception is generated.

12. The computer storage medium of claim 7, receiving a change packet comprises receiving a change packet identifying single instance data.

* * * * *